United States Patent [19]
Schipper et al.

[11] Patent Number: 5,179,054
[45] Date of Patent: Jan. 12, 1993

[54] LAYERED CRACKING CATALYST AND METHOD OF MANUFACTURE AND USE THEREOF

[75] Inventors: Paul H. Schipper, Doylestown, Pa.;
Hartley Owen, Belle Mead, N.J.;
Joseph A. Herbst, Turnersville, N.J.;
Garry W. Kirker, Washington Township, Bergen County, N.J.;
Albin Huss, Jr., Chadds Ford, Pa.;
Pochen Chu, Voorhees, N.J.

[73] Assignee: Mobil Oil Corporation, Fairfax, Va.

[21] Appl. No.: 735,225

[22] Filed: Jul. 24, 1991

Related U.S. Application Data

[63] Continuation-in-part of Ser. No. 516,482, May 1, 1990, Pat. No. 5,077,253, which is a continuation-in-part of Ser. No. 292,204, Dec. 30, 1988, abandoned, and a continuation-in-part of Ser. No. 335,068, Apr. 7, 1989, Pat. No. 5,001,096, which is a continuation-in-part of Ser. No. 138,002, Dec. 28, 1987, abandoned.

[51] Int. Cl.$^5$ .............................................. B01J 29/04
[52] U.S. Cl. .................................... 502/67; 502/65; 502/68
[58] Field of Search .................. 502/61, 67, 65, 68

[56] References Cited

U.S. PATENT DOCUMENTS

| | | | |
|---|---|---|---|
| 4,612,298 | 9/1986 | Hettinger, Jr. et al. | 502/65 |
| 5,006,497 | 4/1991 | Herbst et al. | 502/67 |
| 5,057,296 | 10/1991 | Beck | 423/277 |
| 5,077,253 | 12/1991 | Chu et al. | 502/61 |

OTHER PUBLICATIONS

"Ultralarge Pore Molecular Sieves", P. A. Jacobs & R. A. Santen, 1989, pp. 439-446.

*Primary Examiner*—Carl F. Dees
*Attorney, Agent, or Firm*—Alexander J. McKillop; Charles J. Speciale; Laurence P. Hobbes

[57] ABSTRACT

A layered catalyst suited to the catalytic cracking of heavy feeds comprises a core and a shell. The shell comprises at least 5 wt % of at least 1 molecular sieve having openings of at least 8 angstroms. The core comprises at least 10 wt % of at least 1 molecular sieve having openings comprising a 12 or less-membered ring and has a reduced, if any, content of said molecular sieve having openings of at least 8 angstroms, relative to its concentration in the shell. Suitable molecular sieve materials having openings of at least 8 angstroms include MCM-41, VPI-5, MCM-9 and layered metal oxides, e.g., pillared clays. The required molecular sieve of the core can include zeolite Y, Ultrastable Y or intermediate pore size zeolites such as ZSM-5. The shell which may further contain a metals passivator can act as a metals sink, and can remove metals from the unit by attrition. The catalyst is preferably prepared by forming the core and then coating or encapsulating the core with a shell material. The shell may also comprise an attritable coating of an amorphous rare earth oxide, aluminum oxide and aluminum phosphate composite, which traps metals.

19 Claims, 22 Drawing Sheets

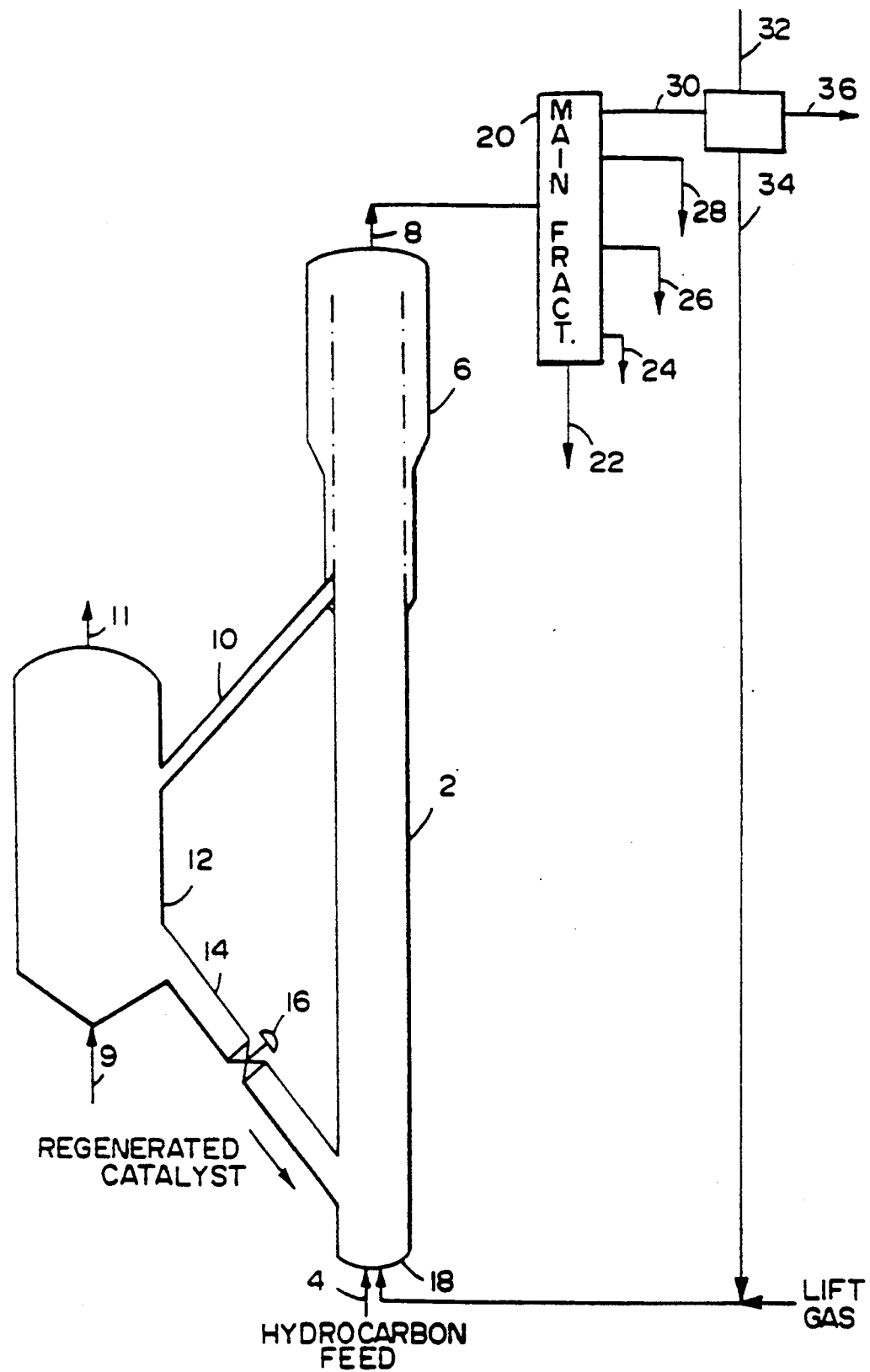

LAYERED CRACKING CATALYST AND METHOD OF MANUFACTURE AND USE THEREOF

CROSS-REFERENCE TO RELATED APPLICATIONS

This application is a Continuation-in-Part of copending application U.S. Ser. No. 516,482, filed May 1, 1990 which in turn is a Continuation-in-Part of our prior copending application U.S. Ser. No. 292,204, filed Dec. 30, 1988, now abandoned, and a Continuation-in-Part of our prior copending application U.S. Ser. No. 335,068, filed Apr. 7, 1989, now U.S. Pat. No. 5,001,096, which is a Continuation-in-Part of parent application U.S. Ser. No. 138,002 filed Dec. 28, 1987, and now abandoned.

All of these related applications are incorporated herein by reference.

FIELD OF THE INVENTION

This invention relates to a catalyst composition, its method of preparation and its use for catalytic cracking of heavy hydrocarbon oils to produce liquid hydrocarbons boiling in the gasoline and distillate range.

BACKGROUND OF THE INVENTION

The present invention can best be understood in the context of its contribution to conventional FCC processes. Accordingly, a brief discussion of conventional cracking processes and catalysts follows.

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units, the hot regenerated catalyst is added to the feed at the base of a riser reactor. The fluidization of the solid catalyst particles may be promoted with a lift gas. Mixing and atomization of the feedstock may be promoted with steam, equal to 1–5 wt % of the hydrocarbon feed. Hot catalyst (650° C.+) from the regenerator is mixed with preheated (150°–375° C.) charge stock. The catalyst vaporizes and superheats the feed to the desired cracking temperature usually 450°–600° C. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products pass to product separation. Typically, the cracked hydrocarbon products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst rich solids portion of the settled product may be recycled to the reactor. The clarified slurry oil is a heavy product.

The "reactor vessel" into which the riser discharges primarily separates catalyst from cracked products and unreacted hydrocarbons and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details of FCC processes can be found in: U.S. Pat. Nos. 3,152,065 (Sharp et al.); 3,261,776 (Banman et al.); 3,654,140 (Griffel et al.); 3,812,029 (Snyder); 4,093,537, 4,118,337, 4,118,338, 4,218,306 (Gross et al.); 4,444,722 (Owen); 4,459,203 (Beech et al.); 4,639,308 (Lee); 4,675,099, 4,681,743 (Skraba) as well as in Venuto et al., Fluid Catalytic Cracking With Zeolite Catalysts, Marcel Dekker, Inc. (1979). The entire contents of these patents and publication are incorporated herein by reference.

Conventional FCC catalysts usually contain finely divided acidic zeolites comprising, e.g., faujasites such as Rare Earth Y (REY), Dealuminized Y (DAY), Ultrastable Y (USY), Rare Earth Containing Ultrastable Y (RE-USY), Si-Enriched Dealuminized Zeolite Y (LZ-210) (disclosed in U.S. Pat. Nos. 4,711,864, 4,711,770 and 4,503,023, all of which are incorporated herein by reference) and Ultrahydrophobic Y (UHP-Y).

Typically, FCC catalysts are fine particles having particle diameters ranging from about 20 to 150 microns and an average diameter around 60–80 microns.

Catalyst for use in moving bed catalytic cracking units (e.g., TCC units) can be in the form of spheres, pills, beads, or extrudates, and can have a diameter ranging from 1 to 6mm.

Although many advances have been made in both the catalytic cracking process, and in catalyst for use in the process, some problem areas remain.

The catalytic cracking process is excellent for converting heavy hydrocarbons to lighter hydrocarbons. Although this conversion is the whole reason for performing catalytic cracking, the boiling range of the cracked product is frequently not optimum for maximum profitability. Usually the gasoline and fuel oil boiling range fractions are the most valuable materials. Light olefins ($C_2$–$C_{10}$ olefins) are highly valuable only if a refiner has a way to convert these olefins into gasoline boiling range materials via, e.g., alkylation, or if these light olefins can be used for their petrochemical value.

The light olefins are useful as a feed for methyl tert-butyl ether (MTBE) and tert-amyl methyl ether (TAME) synthesis and alkylation processes which lead to an overall increase in the refinery gasoline pool.

Additionally, new laws which mandate a higher content of oxygenated compounds in gasoline require refiners to maximize refinery output of light olefins. The light olefins, isobutylenes and isoamylenes, used to produce MTBE and TAME, are the oxygenated gasoline blending components of choice for reformulated gasolines. A proper formulation of catalyst composition and cracking operation conditions can significantly affect the light olefins output. Furthermore, the use of MTBE and TAME as gasoline additives imparts excellent octane gain to both premium and regular gasoline blends.

Additionally, the low molecular weight products can be used to produce high octane blending components to improve the refinery gasoline yield. The low molecular weight products of catalytic cracking can be used to make the highly branched paraffins which have good octane properties by a building-up process known as paraffin alkylation, or, simply, alkylation. The motor octane rating of the products from alkylating the isobutane with the propylene, butylene, and amylene light products of cracking reactions are very good, i.e., 89, 93 and 90 respectively.

Moreover, government regulations which mandate stringent gasoline specifications increase the importance of production of alkylate gasoline. In addition to the enhanced octane, alkylate can help reduce vehicle emissions as the components in the alkylate do not contribute to ozone formation. Also, alkylate has low vapor pressure which allows refiners to maintain government mandated volatility specifications. See L. F. Albright, "Alkylation Will Be Key Process in Reformulated Gasoline ERA", *Oil and Gas Journal*, Nov. 12, 1990, pp. 79-92.

Light paraffins, $C_{10}^-$ materials, are generally not as valuable because of their relatively low octane. The very light paraffins, particularly propane, usually are not as valuable as gasoline. There are ever more stringent limitations on the allowable vapor pressure of gasoline, such that refiners can not blend as much light material into the gasoline as they would like to. Accordingly, there is great interest in converting "top of the barrel" components, or light hydrocarbons in the $C_{10}^-$ boiling range, into heavier products.

There is also a growing need in refineries to convert more of the "bottom of the barrel" or resid fractions into lighter components via catalytic cracking. Many FCC units today add 5-15 wt % resid to the catalytic cracking unit. Such heavy materials in the past were never considered as suitable feeds for catalytic cracking units, because of their high levels of Conradson Carbon, sodium, and dehydrogenation metals such as nickel and vanadium. The market for resids (bunker fuel oil, road asphalt) is so limited that refiners have turned to FCC as one way to upgrade the value of the resid fraction.

The most limiting factor in catalytic cracking of resids in conventional FCC units appears to be metals deposition on the catalyst. The nickel and vanadium in the resid deposit almost stoichiometrically on the FCC circulating catalyst inventory, leading to production of excessive amounts of "dry gas" during catalytic cracking. This problem can be ameliorated to some extent by adding metal passivators, such as antimony, bismuth and/or tin, to passivate the nickel and vanadium components deposited on the catalyst due to processing of resid feed. Usually refiners are also forced to resort to very high levels of catalyst withdrawal and replacement, to maintain the metals levels on the catalyst at a tolerable level, and to maintain catalyst activity. This represents a large daily expense (for make-up catalyst) and presents a disposal problem because the spent catalyst has so much heavy metal on it.

Attempts have been made to modify catalytic cracking catalysts to accommodate heavy feeds. It is known that commercially available FCC catalysts with a high surface area, and an alumina rich matrix, are more resistant to deactivation from metals contamination than other FCC catalysts (Speronello, B. K. and Reagan, W. J., *Oil and Gas Journal*, Jan. 30, 1984, page 139). See also "Method Predicts Activity of Vanadium-Contaminated FCC Catalyst", E. L. Leuenberger, *Oil and Gas Journal*, Jul. 15, 1985, page 125.

Another approach to metals passivation is disclosed in U.S. Pat. No. 4,372,841, incorporated herein by reference. Adding a hydrogen donor material to the reaction zone and passing catalyst through a reduction zone at high temperature at least partially passivates the catalyst.

Vanadium, when deposited on a catalyst, is fairly mobile and can migrate to zeolite sites, attack the zeolite and destroy it. This phenomenon was discussed in "Metals Resistant FCC Catalyst Gets Field Test," Jars, Dalen, *Oil and Gas Journal*, Sep. 20, 1982, page 135.

Although catalyst manufacturers are working on catalysts which apparently can tolerate fairly high levels of metals, and thus permit conversion of more of the "bottom of the barrel" into light products, they have largely ignored the economically related problem of converting light materials, produced during cracking, into more valuable, heavier components.

We have discovered a cracking catalyst, a method for manufacturing and a catalytic cracking process using this catalyst, which is metals tolerant and can, in a preferred embodiment, change the product distribution from catalytic cracking. We have discovered a way to efficiently convert, the "bottom of the barrel" into more valuable products, and in a preferred embodiment, also convert the relatively low value "top of the barrel" materials (incidentally produced during cracking) into more valuable products boiling in the gasoline range.

BRIEF SUMMARY OF THE INVENTION

Accordingly, the present invention provides a layered catalyst comprising a core and a shell, said shell comprising at least 5 wt % of at least 1 molecular sieve having openings of at least 8 angstroms and said core comprising at least 10 wt % of at least 1 molecular sieve having openings comprising a 12 or less-membered ring and said core further having a reduced, if any, content of said molecular sieve having openings of at least 8 angstroms, relative to its concentration in the shell.

In another embodiment, the present invention provides a catalytic cracking catalyst as described above wherein the core comprises 50-99, preferably 65 to 95 weight % of the layered cracking catalyst and the shell comprises 50-1, preferably 35 to 5 weight %; said shell comprising: 5 to 80, preferably 10 to 50 wt % of said molecular sieve having openings of at least 8 angstroms; 20 to 95, preferably 20 to 70 wt % of an inorganic oxide matrix; 0 to 30, preferably 1 to 15 wt % of a metal immobilizing material; and 0 to 20, preferably 0 to 10 wt %. of molecular sieve having openings comprising a 12-membered ring; and said core comprising 10 to 80, preferably 20 to 60 wt % of a molecular sieve having openings comprising a 12-membered ring; 0 to 70, preferably 5 to 20 wt % of a molecular sieve having a Constraint Index of 1-12; and 20 to 95, preferably 20 to 70 wt % of an inorganic oxide matrix.

In a specialized embodiment, the present invention provides the above catalytic cracking catalysts wherein the shell further comprises at least 10 wt % of a coating of a porous refractory material selected from the group of a) a rare earth oxide, aluminum oxide and aluminum phosphate composite; b) a magnesia, alumina, aluminum phosphate composite and c) a tin (IV) oxide composite, around a core cracking catalyst containing at least 10 wt % Zeolite Y, such as rare earth Y zeolite, in a matrix, e.g., a matrix comprising silica and alumina.

In another embodiment, the present invention provides a process for catalytic cracking of a hydrocarbon feed boiling in the gas oil or heavier range to lighter products by contact of the feed with a layered catalytic cracking catalyst comprising a core and a shell, said shell comprising at least 5 wt % of at least 1 molecular sieve having openings of at least 8 angstroms and said core comprising at least 10 wt % of at least 1 molecular sieve having openings comprising a 12 or less-membered ring and said core further having a reduced, if any, content of said molecular sieve having openings of at least 8 angstroms, relative to its concentration in the shell, in a catalytic cracking reactor at catalytic cracking conditions.

In another embodiment, the present invention provides a method of manufacturing a layered catalytic cracking catalyst comprising a) forming a core comprising at least 10 wt % of at least 1 molecular sieve having openings comprising a 12 or less-membered ring and less than 5 wt % of molecular sieve having openings of at least 8 angstroms, by conventional means and b) forming a shell comprising at least 1 wt. % of the overall catalyst and containing at least 5 wt % of at least 1 molecular sieve having openings of at least 8 angstroms around the core by contacting the pre-formed core with a matrix containing at least 5 wt % of said molecular sieve having openings of at least 8 angstroms, and recovering a layered catalyst as a product.

BRIEF DESCRIPTION OF THE DRAWING

FIG. 1a is a schematic diagram of a conventional FCC reactor and regenerator.

DETAILED DESCRIPTION

Figure 1:
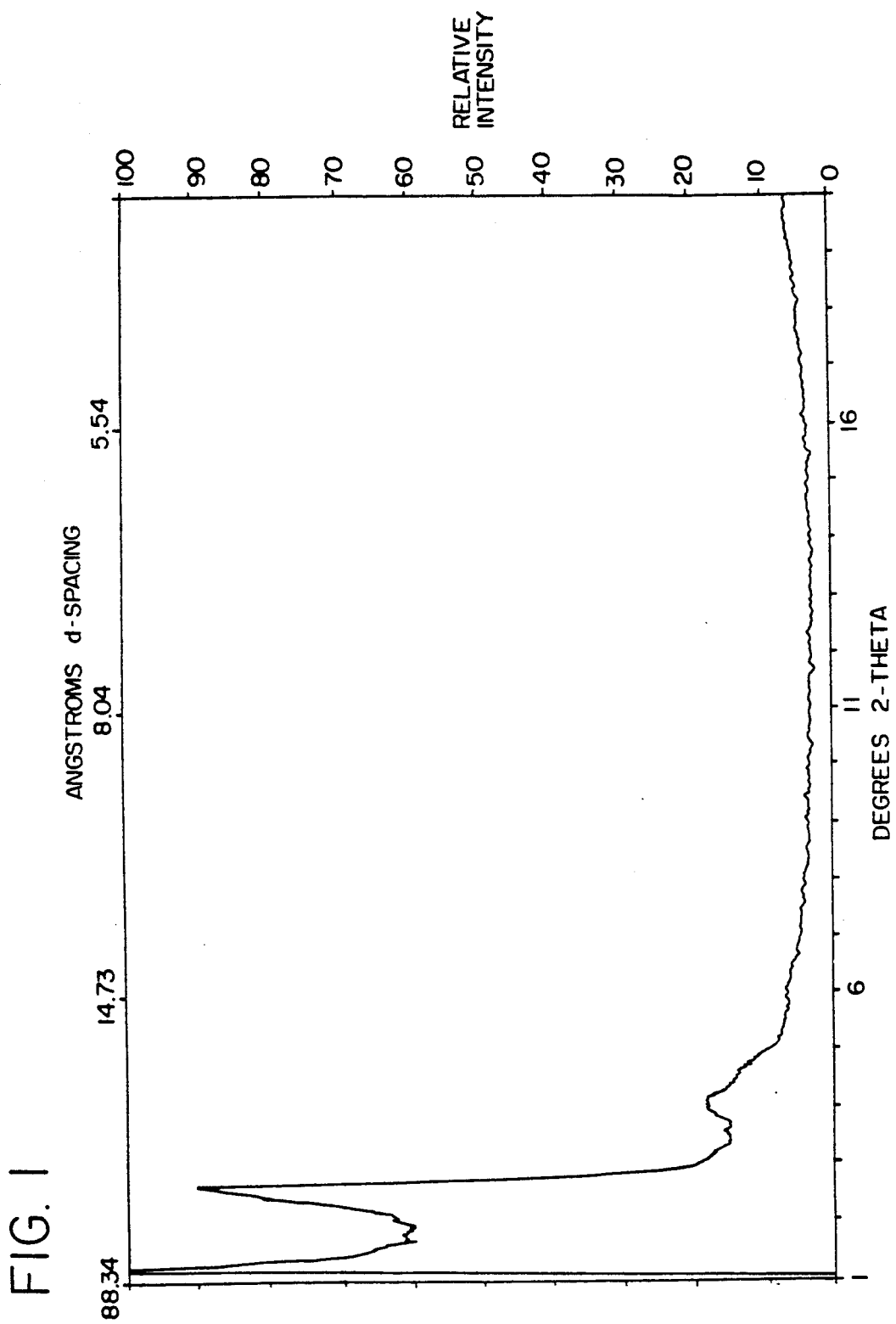
FIGS. 1-15 are X-ray diffraction patterns of products of Examples 1-14 and 16, respectively.

FIG. 1a is a schematic flow diagram of an exemplary FCC unit. Feed is charged to the bottom of the riser reactor 2 via inlet 4. Hot regenerated catalyst is added via conduit 14, equipped with a flow control valve 16. A lift gas is introduced near the liquid and solid feed inlets via conduit 18. The riser reactor is an elongated, cylindrical smooth-walled tube.

The feed vaporizes and forms a dilute phase suspension with the FCC catalyst. The suspension passes up the riser, which generally gets wider to accommodate volumetric expansion. Cracked products and coked catalyst may pass into a solid-vapor separation means, such as a conventional cyclone. Preferably, the riser has a deflector and a short residence time stripper, as disclosed in U.S. Pat. No. 4,629,552 (Haddad and Owen) incorporated by reference. Another good design is the closed cyclone design disclosed in U.S. Pat. No. 4,749,471 (Kam et al.) which is incorporated by reference. A means for stripping entrained hydrocarbons from the catalyst is usually provided in the base of vessel 6. Neither this stripping section, nor the solid-gas separation equipment is shown in the drawing for clarity. Such equipment is conventional. Cracked products are withdrawn from the reactor by conduit 8.

Stripped catalyst containing coke is withdrawn via conduit 10 and charged to regenerator 12. The catalyst is regenerated by contact with an oxygen-containing gas, usually air added via line 9. Flue gas is withdrawn from the regenerator by line 11.

Usually the feed temperature is about 150° C. to 375° C. The regenerator usually operates at about 650° C. to 750° C. and the catalyst to feed weight ratio is usually about 3:1 to 10:1, adjusted as necessary to hold a reactor outlet of about 450° C. to 550° C.

Cracked product from the FCC unit passes from outlet 8 to main fractionator 20, where product is separated into a heavy slurry oil stream 22, heavy distillate 24, light distillate 26, naphtha 28, and a light overhead stream 30, rich in C2-C4 olefins, C1-C4 saturates, and other light cracked gas components. This light stream is usually treated in an unsaturated gas plant 32 to recover various light gas streams, including C3-C4 LPG, and optionally $C_2^-$ fuel gas or the like.

Preferably a light, $H_2$ rich gas stream is recycled from the gas plant via line 34 for use as all, or part, of a lift gas used to contact catalyst in the base of riser 2.

The catalyst and process of the present invention work very well in the conventional FCC units described above, and in TCC units. The maximum benefit from the present invention is achieved when a heavy, metals containing residual feed is at least part of the feed to the catalytic cracking unit.

Feeds

Most FCC and TCC units crack gas oil or vacuum gas oil feeds, i.e., those having an initial boiling point above 400°–500° F., and an end boiling point above 750°–850° F.

The feed can include any wholly or partly non-distillable fraction, e.g., 650° C.+ boiling range material. Resids, deasphalted resids, tar sands, shale oils, coal liquids and similar heavy material, may be used as part or all of the feed.

Layered Catalyst

The catalysts used herein comprise a core and a shell, said shell comprising at least 5 wt % of at least 1 molecular sieve having openings of at least 8 angstroms and said core comprising at least 10 wt % of at least 1 molecular sieve having openings comprising a 12 or less-membered ring and said core further having a reduced, if any, content of said molecular sieve having openings of at least 8 angstroms, relative to its concentration in the shell. We may refer to these catalysts hereafter as "layered" catalysts.

SHELL

The shell is a layer on the outside of the catalyst which comprises at least 5 wt % of a molecular sieve having openings of at least 8 angstroms. Preferably, the shell contains about 5 to 80, more preferably 10 to 50 wt % of said molecular sieve. This extremely large pore molecular sieve component is effective at cracking the very large molecules associated with heavy hydrocarbon feeds known as "bottoms," e.g., resids, tar sands, shale oils, coal liquids and coker gas oils, etc., to the extent that they can be further cracked by the conventional cracking components contained in the core, as described below. Conventional "bottoms-upgrading" cracking catalysts rely principally on active aluminas in their matrices to effect cracking of very large molecules; however, these aluminas preferentially crack "bottoms" to coke and light gases. Because of the "shape selective" nature of the molecular sieves having openings of at least 8 angstroms which are utilized in the shell of the present catalyst, preferential cracking to higher value products such as Heavy Cycle Oils (HCO) and Light Cycle Oils (LCO) rather than overcracking to coke and light gases is effected. Placement of such relatively more expensive molecular sieve components in the shell of a layered cracking catalyst optimizes their effectiveness in such applications.

The shell can further comprise a conventional matrix material, such as alumina, silica-alumina, or silica, e.g., in amounts ranging from 20 to 95, preferably 20 to 70 wt %. The function of the matrix in conventional catalytic cracking catalysts is well known. Briefly stated, the matrix protects the relatively soft and fragile molecular sieve components from physical damage. The matrix acts to some extent as a sodium sink. It also minimizes localized high temperatures when burning coke from the molecular sieve.

In the present invention, the shell functions as a metals getter or sink and achieves some cracking of extremely large molecules. Preferably a relatively soft, porous alumina, is used as a matrix material. Metals tend to deposit rapidly on such materials, and the gradual attrition of, e.g., the alumina permits metals to be removed from the unit with catalyst "fines".

The shell can thus perform, in a preferred embodiment, a dual role. The shell first provides a place for metals in the feed to deposit. This keeps Ni, V, etc, from the molecular sieve cracking components in the core. Then the metals are removed with alumina, or other shell material, as "fines." Metals removal minimizes migration of metal, or formation of reactive species in the unit, such as pentavalent vanadium compounds in the regenerator.

Rather than remove the deposited metals by attrition, the metals can be immobilized. Incorporation of compounds which react with Ni, V, Na, Fe, or other deposited metals to form stable metal compounds is beneficial. BaO, MgO, CaO, $La_2O_3$, $Ce_2O_3$ and similar alkaline and/or rare earth compounds, e.g., oxides thereof, form, e.g., stable vanadium compounds which neither migrate by solid-solid interactions nor form volatile vanadium compounds in the FCC regenerator. Additional metal immobilizing materials suited for use in the present catalyst include those selected from the group consisting of phosphates, titanates, and stannates.

As earlier noted, the shell effects conversion of extremely large molecules found in residual fractions. These large molecules can not fit readily into conventional large pore zeolites, e.g., those having openings comprising a 12-membered ring such as zeolite X or Y. The molecular sieve having openings of at least 8 angstroms present in the shell may not be as active a cracking catalyst as conventional zeolitic cracking catalysts, but only limited conversion of very large molecules in the feed is necessary to render these large molecules down to a size where they can be cracked by catalysts containing molecular sieves having openings comprising a 12-membered ring, e.g., large pore zeolites such as zeolite X or Y.

Molecular Sieves Having Pores of at Least 8 Angstroms

Several recently developed very large-pore cracking components may be used as the molecular sieve having pore openings of at least 8 angstroms required in the shell of the layered catalyst of the present invention. All of these materials have a geometric pore opening or portal of at least 8 angstroms in diameter. Preferably such materials have pore openings comprising at least 18-membered rings.

A. VPI-5 is a molecular sieve with pore openings larger than about 10 Angstrom units in diameter. It is an aluminophosphate type sieve with 18-membered rings of tetrahedrally-coordinated or T-atoms. Such molecular sieves have very large pore volumes, and extremely large pore openings. Such large pore sieves would be very useful for cracking the very large molecules associated with high boiling or residual fractions. By contrast faujasites have pore openings containing 12-membered rings. VPI-5 was described by M. Davis, C. Saldarriaga, C. Montes, and J. Garces in a paper presented at "Innovations in Zeolite Materials Science" Meeting in Nieuwpoort, Belgium, Sep. 13-17, 1987. See also M. E. Davis, C. Saldarriaga, C. Montes, J. Garces and C. Crowder, Nature 331, 698 (1988).

B. Related materials also suited to such use include those set out in U.S. Pat. No. 4,880,611, incorporated herein by reference in its entirety. This reference describes a composition of matter known as MCM-9 comprising crystals having a framework topology after heating at 110° C. or higher giving an X-ray diffraction pattern with interplanar d-spacings at 16.4±0.2 angstroms, 8.2±0.1 angstroms and 4.74±0.05 angstroms, and without a significant interplanar d-spacing at 13.6–13.3 angstroms. Such materials can include SAPOs or silicon-substituted aluminophosphates, which have a three dimensional crystal framework of suitable size may also be used as the required molecular sieve component in the shell of the present layered catalyst. U.S. Pat. No. 4,440,871 and U.S. Pat. No. 4,741,892 and U.S. Pat. No. 4,689,138, which are incorporated herein by reference, disclose other silicoaluminophosphate molecular sieves suited to use in the present invention. U.S. Pat. No. 4,713,227 discloses metalloaluminophosphates suited to use herein which contain metals such as titanium, germanium and antimony within the framework.

C. Pillared, interlayered metal oxides, e.g., clays, may also be used as the molecular sieve having openings of at least 8 angstroms. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. 4,367,163, pillars of silica are added to smectites to increase the interplatelet distances. U.S. 4,515,901 and U.S. Pat. No. 4,367,163 are incorporated herein by reference.

U.S. Pat. No. 4,757,041, which is incorporated herein by reference, discloses a class of pillared interlayered clay molecular sieves products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al.), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP 0 284 278 A2 (Kirker et al.), which is incorporated herein by reference, discloses hydrocracking a heavy feed containing polycyclic aromatics to form a lube based stock. The hydrocracking catalyst comprises a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the large pore cracking component of the present invention.

Published European Application EP 0 205 711 A2 (Chu et al.), and U.S. Pat. No. 4,859,648 to Landis et al., both of which are incorporated herein by reference, disclose layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be used as all or part of the required cracking component in the shell of the layered catalyst of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

D. Mesoporous siliceous materials are recent developments in catalyst technology having novel pore geometry which are suitable as molecular sieves having openings of at least 8 angstroms which are used as components of the layered catalyst of the present invention. Such materials can be described as inorganic, porous non-layered crystalline phase material exhibiting, after calcination, an X-ray diffraction pattern with at least one peak at a d-spacing greater than about 18 Angstrom Units and having a benzene adsorption capacity of greater than 15 grams benzene per 100 grams of said calcined material at 50 torr and 25° C. Such materials can further be characterized by substantially uniform hexagonal honeycomb microstructure, with uniform pores having a cell diameter greater than 13 Angstrom units, say, 15 Angstrom Units, (preferably in the mesoporous range of about 20–100A). Most prominent among these ultra-large pore size materials is a new metallosilicate called MCM-41, which is usually synthesized with Bronsted acid active sites by incorporating a tetrahedrally coordinated trivalent element, such as Al, Ga, B, or Fe, within the silicate framework. Aluminosilicate materials of this type are thermally and chemically stable, properties favored for acid catalysis; however, the advantages of mesoporous structures may be utilized by employing highly siliceous materials or crystalline metallosilicate having one or more tetrahedral species having varying degrees of acidity. In addition to the preferred aluminosilicates, the gallosilicate, ferrosilicate and borosilicate materials may be employed. Although matrices may be formed with the germanium analog of silicon, these are expensive and generally no better than the metallosilicates.

MCM-41 crystalline structure is readily recognized by its spectrographic characteristics, such as electron micrograph, X-ray diffraction pattern, absorption properties, etc., as described in U.S. patent application Ser. No. 07/625,245 (Vartuli et al. and PCT application PCT/US91/00350, filed Jan. 25, 1991.

Such catalysts include the ultra-large pore crystalline aluminosilicates having a silica-to-alumina ratio of about 5:1 to 1000:1 and significant Bronsted acid activity. Acid activity may be measured by acid cracking activity or ammonia absorption properties, such as temperature programmed desorption.

In discussing tetrahedrally coordinated metal oxides of the zeolitic type, it is understood that adjacent metal sites in the matrix are linked by oxygen (i.e., —Si—O—Si—). The honeycomb microstructure of MCM-41 and related mesoporous materials may include several moieties interconnected in a three dimensional matrix or lattice having large hexagonal channels therein forming the ultralarge pores of the catalyst. The repeating units forming the large ring structure of the lattice vary with pore size. A typical catalyst component having Bronsted acid sites consists essentially of crystalline aluminosilicate having the structure of MCM-41, optionally containing 5 to 95 wt. % silica, clay and/or alumina binder. These siliceous materials may be employed in their acid form, ion-exchanged or impregnated with one or more suitable metals, such as Ga, Pd, Zn, Ni, Co and/or other metals of Periodic Groups IIIA to VIIIA and IB to IIB (IUPAC). In the description of preferred embodiments catalyst particles consist essentially of pelletized H-MCM-41 (hydrogen form) catalyst.

The inorganic, non-layered mesoporous crystalline catalytic material employed in this invention has the following composition:

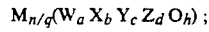

$$M_{n/q}(W_a X_b Y_c Z_d O_h);$$

wherein W is a divalent element, such as a divalent first row transition metal, e.g., manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$.

In the as-synthesized form, this material has a composition, on an anhydrous basis, expressed empirically as follows: $rRM_{n/q}(W_a X_b Y_c Z_d O_h)$; wherein R is the total organic material not included in M as an ion, and r is the coefficient for R, i.e., the number of moles or mole fraction of R.

The M and R components are associated with the material as a result of their presence during crystallization, and are easily removed or, in the case of M, replaced by post-crystallization methods hereinafter more particularly described. To the extent desired, the original M, e.g., sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g., ammonium, ions and mixtures thereof. Particularly preferred ions are those which tailor the catalytic activity for certain hydrocarbon conversion reactions. These include hydrogen, rare earth metals and metals of Groups IA (e.g., K), IIA (e.g., Ca), VIIA (e.g., Mn), VIIIA (e.g., Ni), IB (e.g., Cu), IIB (e.g., Zn), IIIB (e.g., In), IVB (e.g., Sn), and VIIB (e.g., F) of the IUPAC Periodic Table of the Elements.

The crystalline (i.e., meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of from about 13 angstroms to about 200 angstroms. The mesoporous materials suited to this invention will have uniform pores within the range of from about 13 angstroms to about 200 angstroms, more usually from about 15 angstroms to about 100 angstroms. For present purposes, a working definition of "porous" is a material that adsorbs at least 1 gram of a small molecule, such as Ar, $N_2$, n-hexane or cyclohexane, per 100 grams of the solid.

These mesoporous materials of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The material appears to have a hexagonal arrangement of large open channels that can be synthesized with open internal diameters from about 13 angstroms to about 200 angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the d100 values from the electron diffraction patterns.

The most regular preparations of this mesoporous material give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The d100 spacing of the electron diffraction patterns is the distance between adjacent spots on the hk0 projection of the hexagonal lattice and is related to the repeat distance $a_0$ between channels observed in the electron micrographs through the formula $d_{100}=a_0 \sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, this crystalline material may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g., thermal treatment. Pore blocking inorganic amorphous materials, e.g., silica, and organics may be removed by contact with acid or base or other chemical agents such that the detrital material will be removed without detrimental effect on the crystal of the invention.

More particularly, the calcined mesoporous crystalline non-layered material may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, this calcined inorganic, non-layered crystalline material is characterized as having a pore size of about 13 angstroms or greater as measured by physisorption measurements, hereinafter more particularly set forth. Pore size is considered a maximum perpendicular cross-section pore dimension of the crystal.

X-ray diffraction data relating to these mesoporous materials were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the mesoporous material after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the mesoporous composition should be subjected to treatment to remove part or all of any organic constituent. The composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The mesoporous crystalline material, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The mesoporous crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g., sodium or potassium, cation if desired, one or a combination of oxides selected from the group consisting of divalent element W, e.g., cobalt, trivalent element X, e.g., aluminum, tetravalent element Y, e.g., silicon, and pentavalent element Z, e.g., phosphorus, an organic (R) directing agent, hereinafter more particularly described, and a solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e., the organic and additional organic directing agents, hereinafter more particularly described. This second method comprises preparing a reaction mixture containing sources of, for example, alkali or alkaline earth metal (M), e.g., sodium or potassium, cation if desired, one or a combination of oxides selected from the group consisting of divalent element W, e.g., cobalt, trivalent element X, e.g., aluminum, tetravalent element Y, e.g., silicon, and pentavalent element Z, e.g., phosphorus, a combination of organic directing agent and additional organic directing agent (R), each hereinafter more particularly described, and a solvent or solvent mixture, such as, for example, $C_1-C_6$ alcohols, $C_1-C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $(M_{2/e}O)/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g., sodium or potassium, cation if desired, one or more sources of aluminum and/or silicon, an organic (R) directing agent, hereinafter more particularly described, and a solvent or solvent mixture, such as, for example $C_1-C_6$ alcohols, $C_1-C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g., silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for such synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_2/O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the present crystalline material can be carried out under either static or agitated, e.g., stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g., from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the mesoporous non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods for these materials include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g., Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

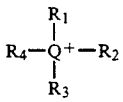

wherein Q is nitrogen or phosphorus and wherein at least one of $R_1$, $R_2$, $R_3$ and $R_4$ is aryl or alkyl of from 6 to about 36 carbon atoms, e.g., $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals thus prepared can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

Examples 1 to 22(a) below relate to the preparation and characterization of MCM-41 materials. In the examples metric units and parts by weight are employed unless otherwise indicated.

EXAMPLE 1

One hundred grams of cetyltrimethylammonium (CTMA) hydroxide solution, prepared by contacting a 29 wt. % N,N,N-trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

2.7 moles $Na_2O$
392 moles $SiO_2$
35.7 moles $(CTMA)_2O$
61.7 moles $(TMA)_2O$
6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The X-ray diffraction pattern of the calcined product of this example is shown in FIG. 1. In this and the following Figures, it is noted that 10 Angstrom Units d-spacing corresponds to 8.842 degrees 2-theta (Cu K-alpha radiation) and 18 Angstrom Units corresponds to 4.909 degrees.

The product of this example may be characterized as including a very strong relative intensity line at 37.8±2.0 angstroms d-spacing, and weak lines at 21.6±1.0 and 19.2±1.0 angstroms. The present ultra-large pore material was demonstrated to be in the product of this example by transmission electron microscopy (TEM), which produced images of a hexagonal arrangement of uniform pores and hexagonal electron diffraction pattern with a $d_{100}$ value of about 39 angstroms.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$
291 moles $SiO_2$
35.7 moles $(CTMA)_2O$
102 moles $(TMA)_2O$
6120 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 993 $m^2/g$ and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

Figure 2:
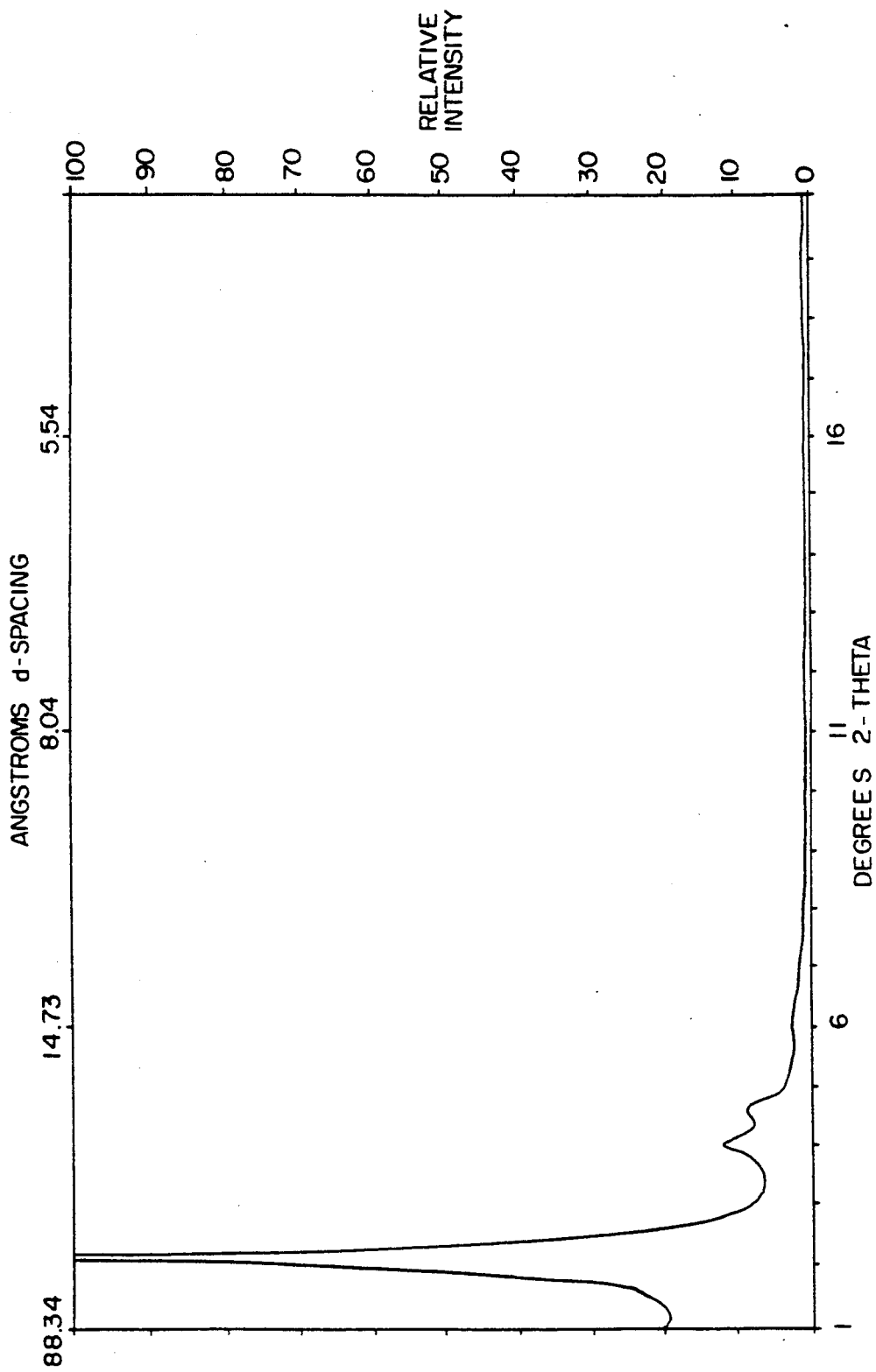

The X-ray diffraction pattern of the calcined product of this example is shown in FIG. 2. It may be characterized as including a very strong relative intensity line at 39.3±2.0 angstroms d-spacing, and weak lines at 22.2±1.0 and 19.4±1.0 angstroms. TEM indicated that the product contained the present ultra-large pore material.

A portion of the above product was then contacted with 100% steam at 1450° F. for two hours. The surface area of the steamed material was measured to be 440 $m^2/g$, indicating that about 45% was retained following severe steaming.

Another portion of the calcined product of this example was contacted with 100% steam at 1250° F. for two hours. The surface area of this material was measured to be 718 $m^2/g$, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

0.65 moles $Na_2O$
65 moles $SiO_2$
8.8 moles $(CTMA)_2O$
1.22 moles $(TPA)_2O$
1336 moles $H_2O$ The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

0.65 moles $Na_2O$
65 moles $SiO_2$
15 moles $(CTMA)_2O$
1.22 moles $(TPA)_2O$
35.6 moles $(TMA)_2O$
2927 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1085 $m^2/g$ and the following equilibrium adsorption capacities in grams/100 grams:

| | |
|---|---|
| $H_2O$ | 11.5 |

| | |
|---|---|
| Cyclohexane | >50 |
| n-Hexane | 39.8 |
| Benzene | 62 |

Figure 3:
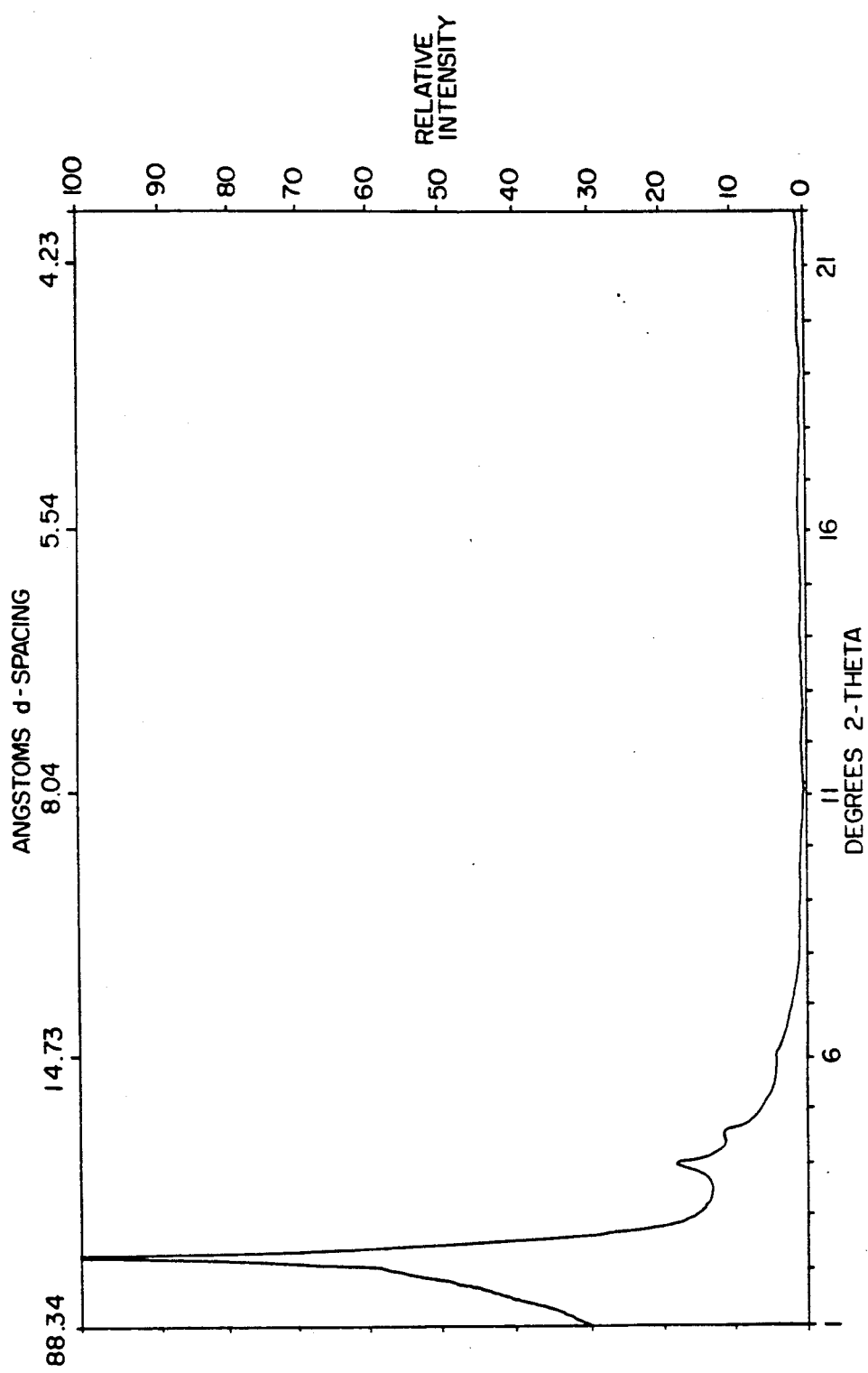

The X-ray diffraction pattern of the calcined product of this example is shown in FIG. 3. The product of this example may be characterized as including a very strong relative intensity line at 38.2±2.0 angstroms d-spacing, and weak lines at 22.2±1.0 and 19.4±1.0 angstroms. TEM indicated the product contained the present ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

0.23 moles $Na_2O$
33.2 moles $SiO_2$
6 1 moles $(CTMA)_2O$
5.2 moles $(TMA)_2O$
780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 $m^2/g$ and the following equilibrium adsorption capacities in grams/100 grams:

| | |
|---|---|
| $H_2O$ | 6.3 |
| Cyclohexane | >50 |
| n-Hexane | 49.1 |
| Benzene | 66.7 |

Figure 4:
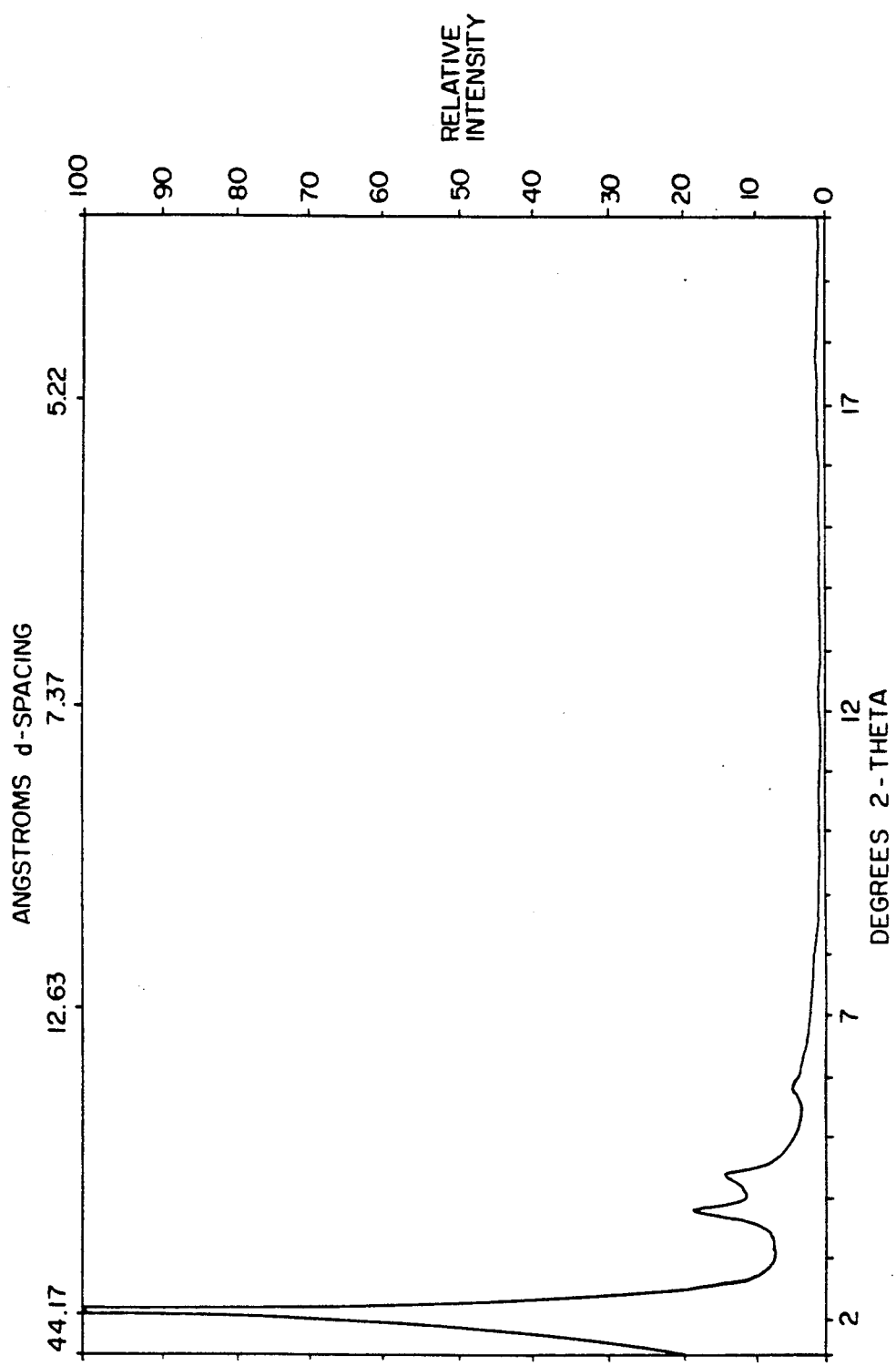

The X-ray diffraction pattern of the calcined product of this example is shown in FIG. 4. It may be characterized as including a very strong relative intensity line at 40.8±2.0 angstroms d-spacing, and weak lines at 23.1±1.0 and 20.1± 1.0 angstroms. TEM indicated that the product contained the present ultra-large pore material (see Example 23).

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:

1.0 moles $P_2O_5$
0.51 moles $(Pyr)_2O$
47.2 moles $H_2O$

The resulting solid product was recovered by filtration and dried in air at ambient temperature. The product was then calcined at 540° C. for 1 hour in nitrogen, followed by 6 hours in air.

The calcined product proved to have a surface area of 707 $m^2/g$ and the following equilibrium adsorption capacities in grams/100 grams:

| | |
|---|---|
| $H_2O$ | 33.2 |
| Cyclohexane | 19.7 |
| n-Hexane | 20.1 |
| Benzene | 23.3 |

Figure 5:
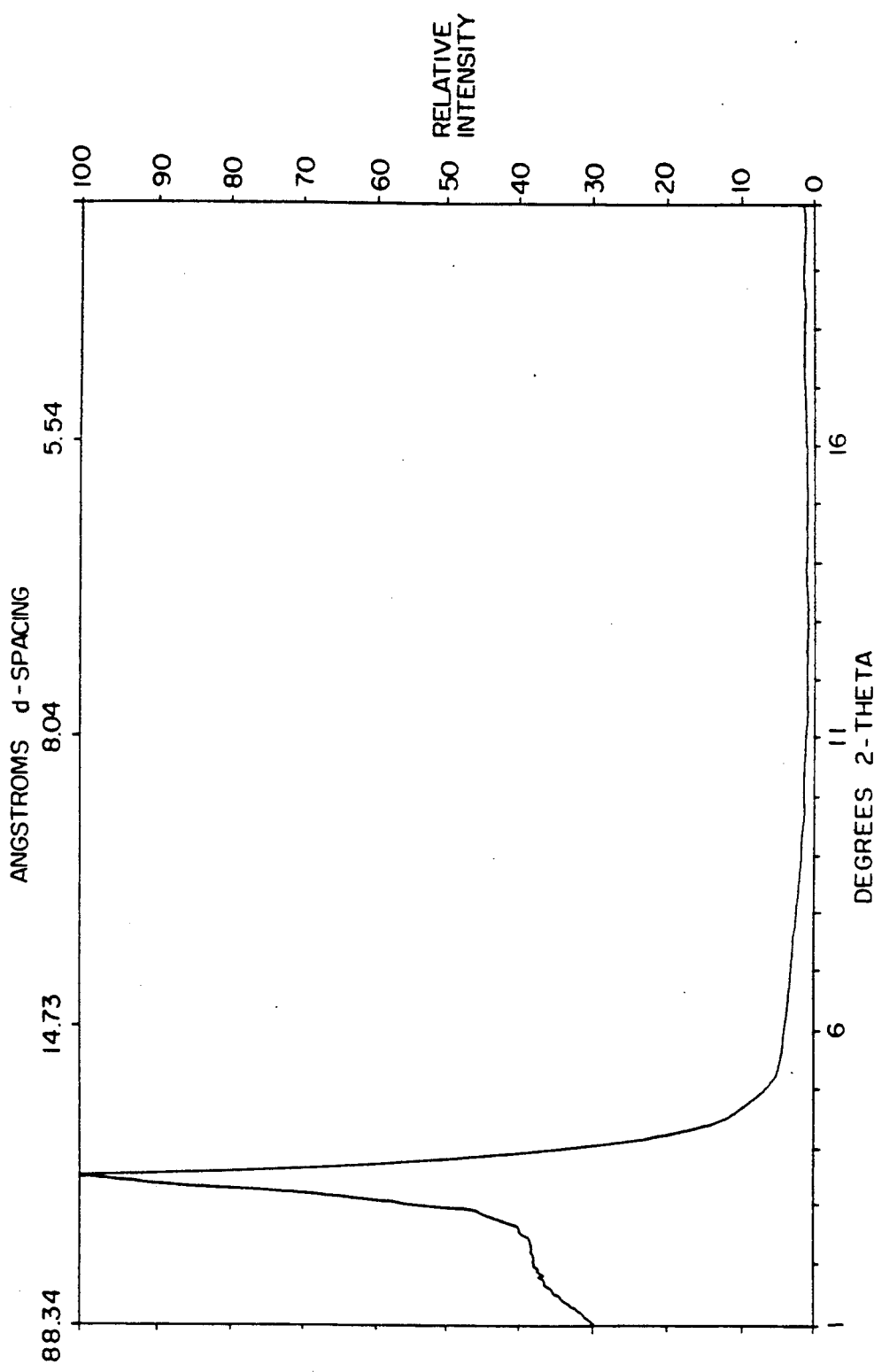

The X-ray diffraction pattern of the calcined product of this example is shown in FIG. 5. It may be characterized as including a very strong relative intensity line at 25.4±1.5 angstroms d-spacing. TEM indicated the product contained the present ultra-large pore material (see Example 23).

EXAMPLE 6

A solution of 1.35 grams of $NaAlO_2$ (43.5% $Al_2O_3$, 30% $Na_2O$) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

0.25 moles $Al_2O_3$
10 moles $Na_2O$
36 moles $SiO_2$
0.95 moles $(CTMA)_2O$
2.5 moles $(TEA)_2O$
445 moles $H_2O$ The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % $SiO_2$ and 5.1 wt. % $Al_2O_3$, and proved to have a benzene equilibrium adsorption capacity of 58.6 grams/100 grams.

Figure 6:
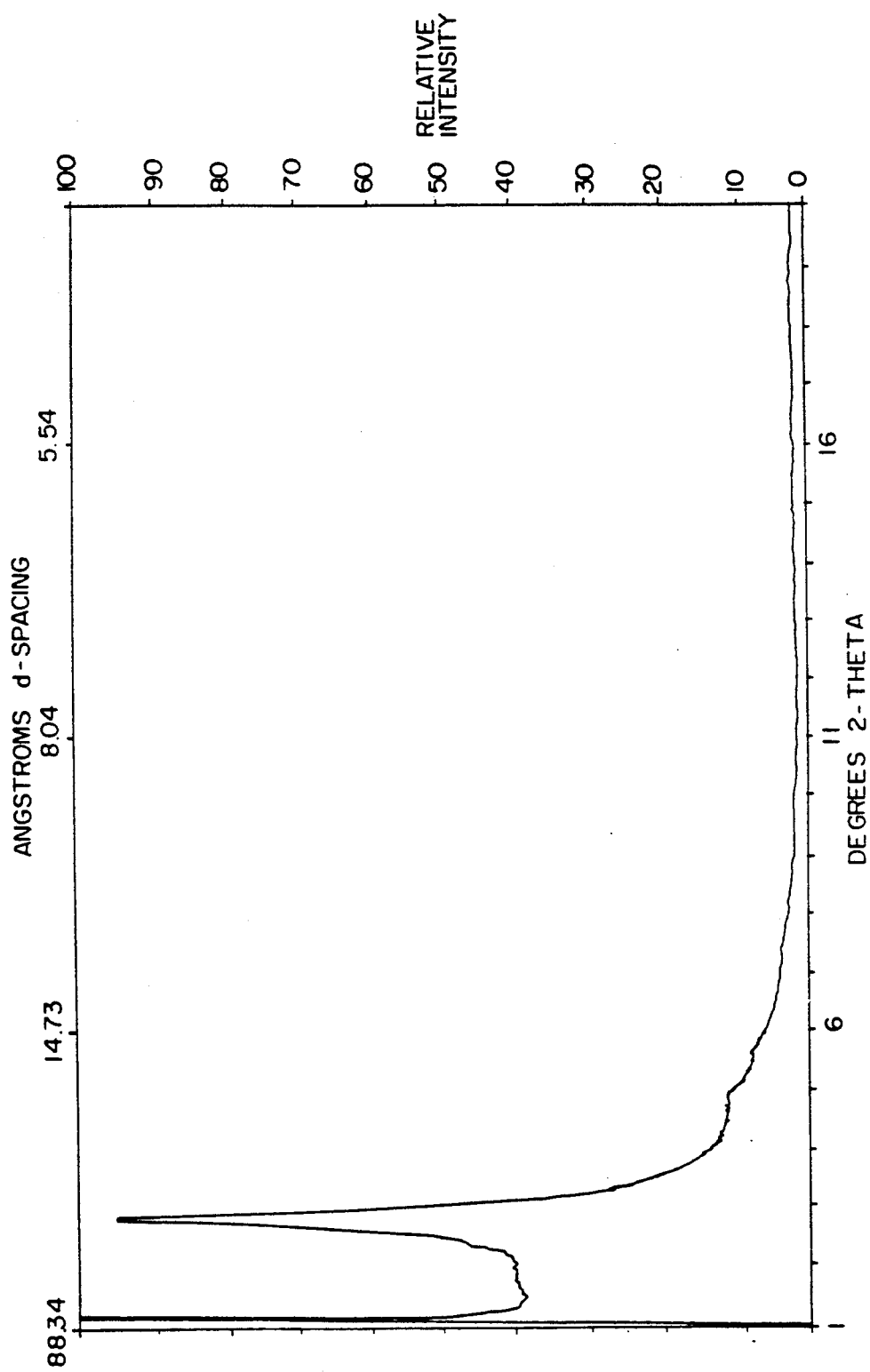

The X-ray diffraction pattern of the calcined product of this example is shown in FIG. 6. The product of this example may be characterized as including a very strong relative intensity line at 31.4±1.5 angstroms d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C for 48 hours with stirring at 200 rpm. The mixture has a composition in terms of moles per mole $SiO_2$:

0.5 mole $(CTMA)_2O$ 46.5 moles H$_2$O

The resulting solid product was recovered by filtration, washed with water, then calcined at 540° C. for 1 hour in nitrogen, followed by 10 hours in air.

The calcined product composition included less than 0.01 wt. % Na, about 98.7 wt. % SiO$_2$ and about 0.01 wt. % Al$_2$O$_3$, and proved to have a surface area of 896 m$^2$/g. The calcined product had the following equilibrium adsorption capacities in grams/100 grams:

| | |
|---|---|
| H$_2$O | 8.4 |
| Cyclohexane | 49.8 |
| n-Hexane | 42.3 |
| Benzene | 55.7 |

Figure 7:
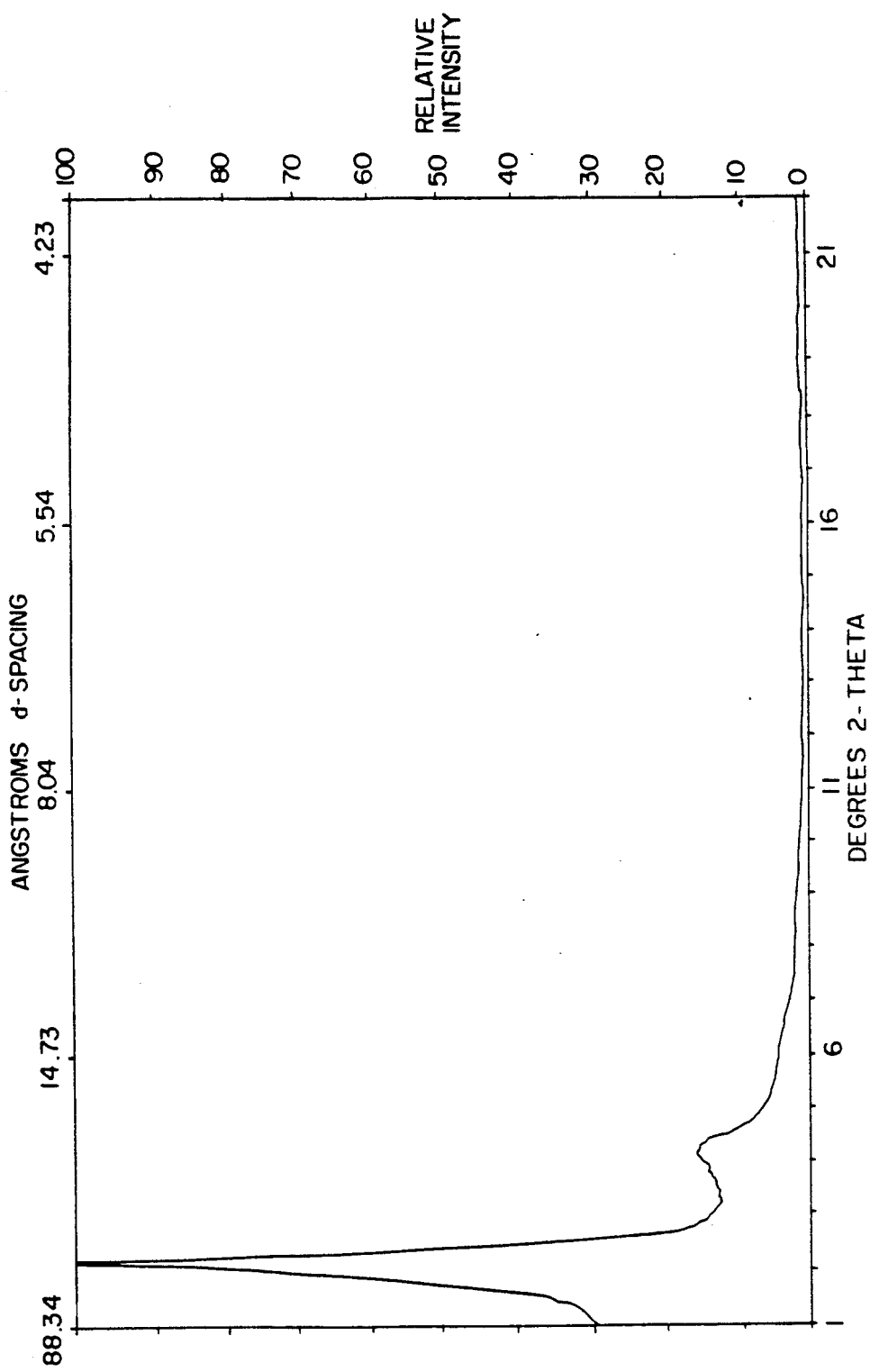

The X-ray diffraction pattern of the calcined product of this example is shown in FIG. 7. It may be characterized as including a very strong relative intensity line at 40.0±2.0 angstroms d-spacing and a weak line at 21.2±1.0 angstroms. TEM indicated that the product of this example contained at least three separate phases, one of which was the present ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole SiO$_2$:
0.5 mole (CTMA)$_2$O
46.5 moles H$_2$O The resulting solid product was recovered by filtration, washed with water, then calcined at 540° C. for 6 hours in air.

The calcined product composition was measured to include 0.01 wt. % Na, 93.2 wt. % SiO$_2$ and 0.016 wt. % Al$_2$O$_3$, and proved to have a surface area of 992 m$^2$/g and the following equilibrium adsorption capacities in grams/100 grams:

| | |
|---|---|
| H$_2$O | 4.6 |
| Cyclohexane | >50 |
| n-Hexane | >50 |
| Benzene | 62.7 |

Figure 8:
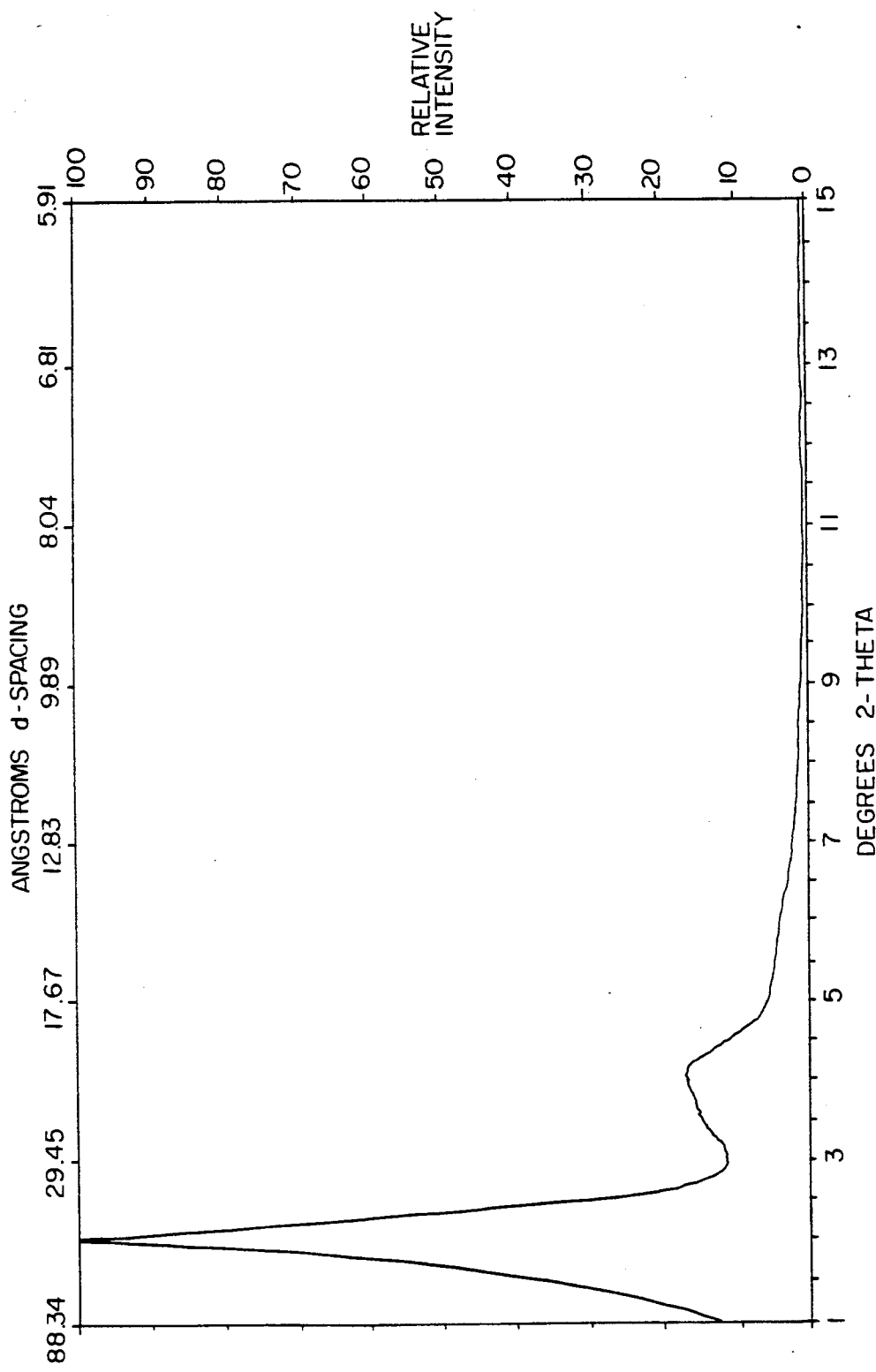

The X-ray diffraction pattern of the calcined product of this example is shown in FIG. 8. This product may be characterized as including a very strong relative intensity line at 43.6±2.0 angstroms d-spacing and weak lines at 25.1±1.5 and 21.7±1.0 angstroms. TEM indicated that the product contained the present ultra-large pore material.

EXAMPLE 9

Sodium aluminate (4.15g) was added slowly into a solution containing 16 g of myristyltrimethylammonium bromide (C$_{14}$TMABr) in 100 g of water. Tetramethylammonium silicate (100 g-10% SiO$_2$), HiSil (25 g) and tetramethylammonium hydroxide (14.2 g-25% solution) were then added to the mixture. The mixture was crystallized in an autoclave at 120° C. with stirring for 24 hours.

Figure 9:
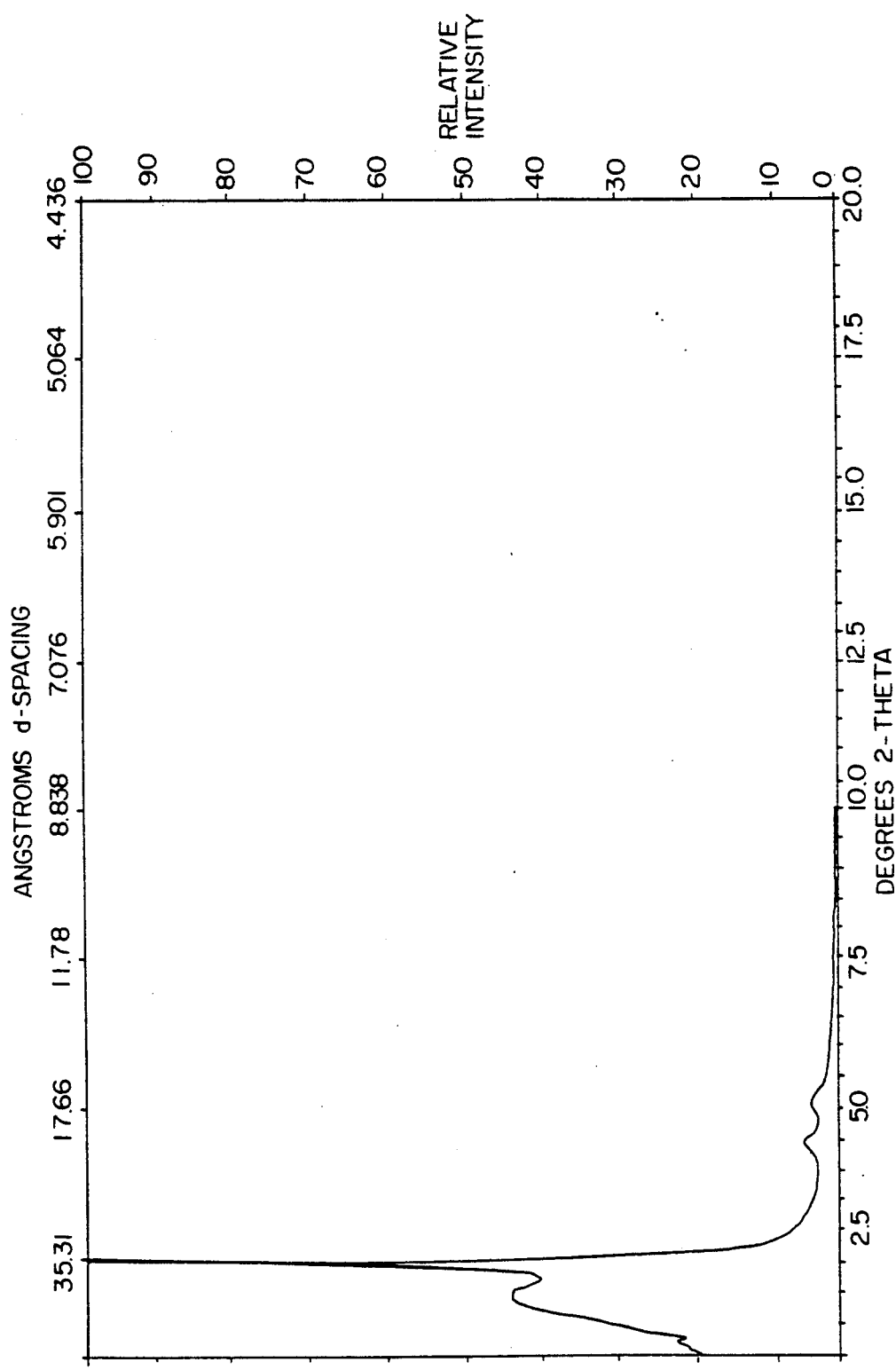

The product was filtered, washed and air dried. Elemental analysis showed the product contained 53.3 wt % SiO$_2$, 3.2 wt % Al$_2$O$_3$, 15.0 wt % C, 1.88 wt % N, 0.11 wt % Na and 53.5 wt % ash at 1000° C. FIG. 9 shows the X-ray diffraction pattern of the material having been calcined at 540° C. for 1 hour in N$_2$ and 6 hours in air. The X-ray diffraction pattern includes a very strong relative intensity line at 35.3±2.0 angstroms d-spacing and weak lines at 20.4±1.0 and 17.7±1.0 angstroms d-spacing. TEM indicated that the product contained the present ultra-large pore material.

The washed product, having been exchanged with 1N ammonium nitrate solution at room temperature, then calcined, proved to have a surface area of 827 m$^2$/g and the following equilibrium adsorption capacities in g/100 g anhydrous sorbent:

| | |
|---|---|
| H$_2$O | 30.8 |
| Cyclohexane | 33.0 |
| n-Hexane | 27.9 |
| Benzene | 40.7 |

EXAMPLE 10

Sodium aluminate (8.3 g) was added slowly into a solution containing 184 g of dodecyltrimethylammonium hydroxide (C$_{12}$TMAOH, 50%) solution diluted with 480 g of water. UltraSil (50 g) and an aqueous solution of tetramethylammonium silicate (200 g-10% SiO$_2$) and tetramethylammonium hydroxide (26.38 g-25% solution) were then added to the mixture. The mixture was crystallized in an autoclave at 100° C. with stirring for 24 hours.

Figure 10:
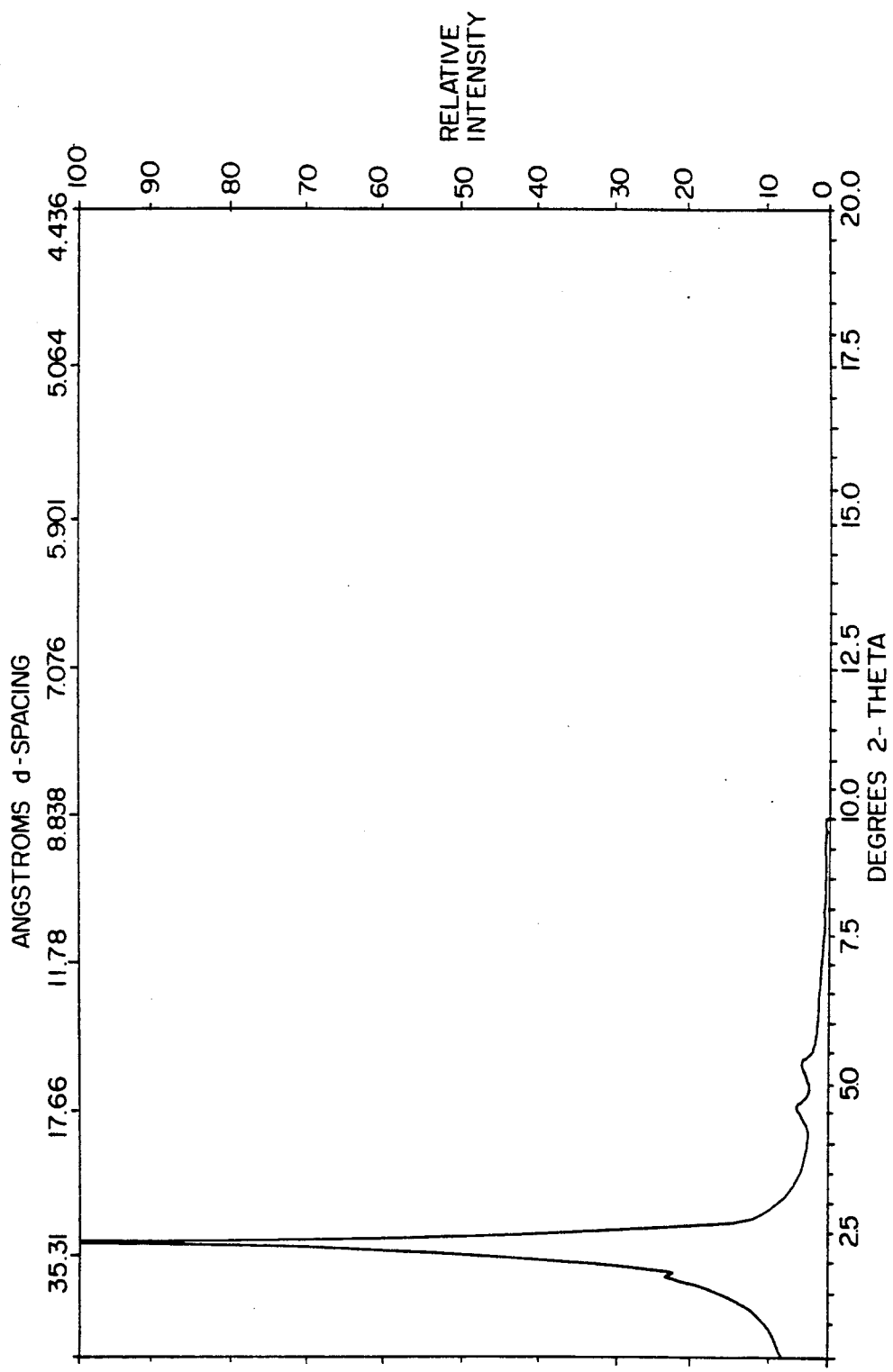

The product was filtered, washed and air dried. FIG. 10 shows the X-ray diffraction pattern of the material having been calcined at 540° C. for 1 hour in N$_2$ and 6 hours in air. The X-ray diffraction pattern includes a very strong relative intensity line at 30.4±1.5 angstroms d-spacing and weak lines at 17.7±1.0 and 15.3±1.0 angstroms d-spacing. TEM indicated that the product contained the present ultra-large pore material.

The washed product, having been exchanged with 1N ammonium nitrate solution at room temperature, then calcined, proved to have a surface area of 1078 m$^2$/g and the following equilibrium adsorption capacities in g/100 g anhydrous sorbent:

| | |
|---|---|
| H$_2$O | 32.6 |
| Cyclohexane | 38.1 |
| n-Hexane | 33.3 |
| Benzene | 42.9 |

EXAMPLE 11

A solution of 4.9 grams of NaAlO$_2$ (43.5 % Al$_2$O$_3$, 30% NaO$_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole Al$_2$O$_3$:
1.1 moles Na$_2$O
30.6 moles SiO$_2$
3.0 moles (TEA)$_2$O
3.25 moles (CTMA)$_2$O
609 moles H$_2$O The resulting solid product was recovered by filtration, washed with water then calcined at 540° C. for 16 hours in air.

The calcined product proved to have a surface area of 1352 m²/g and the following equilibrium adsorption capacities in grams/100 grams:

| | |
|---|---|
| H₂O | 23.6 |
| Cyclohexane | >50 |
| n-Hexane | 49 |
| Benzene | 67.5 |

Figure 11:
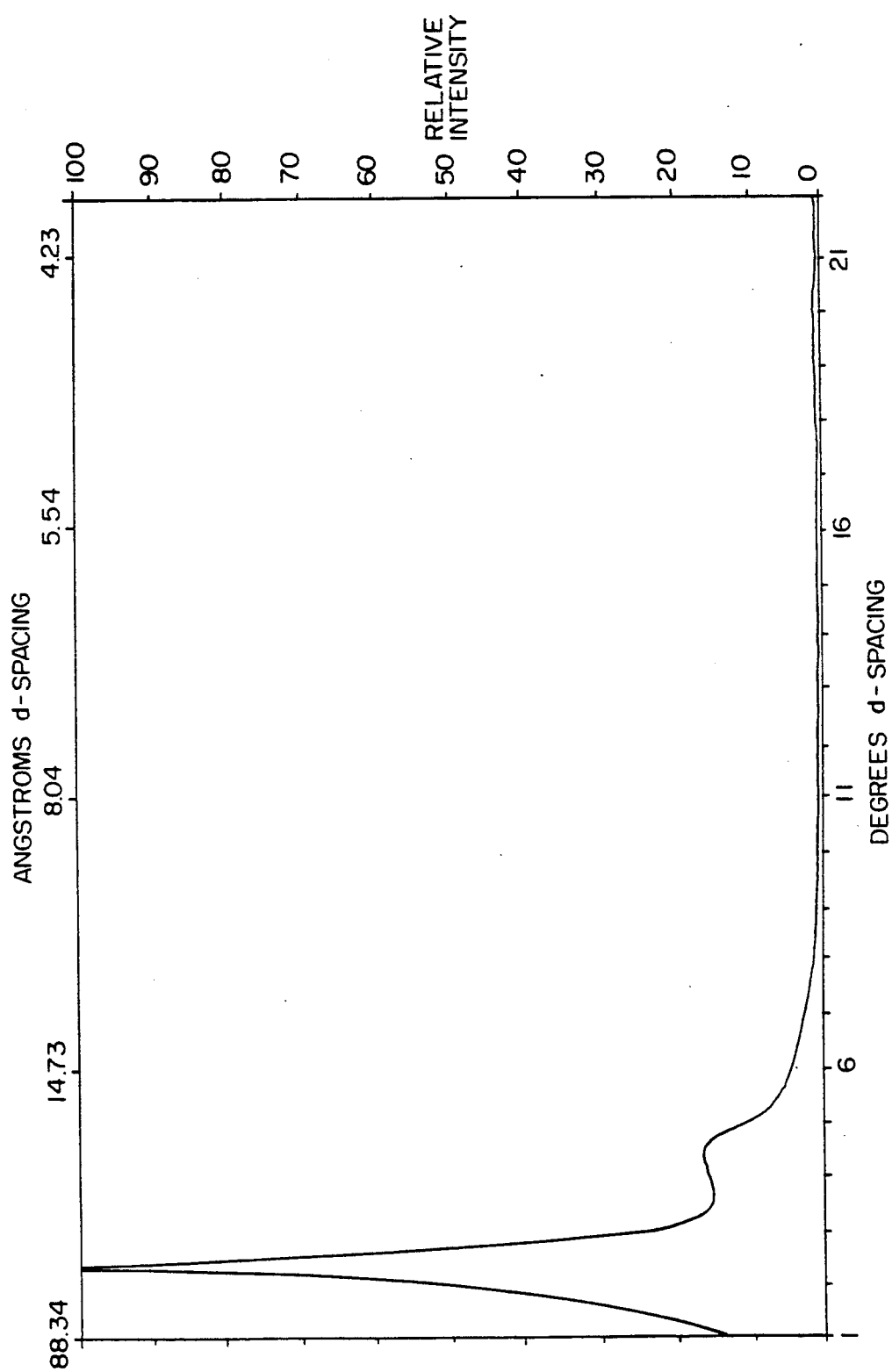

The X-ray diffraction pattern of the calcined product of this example is shown in FIG. 11. The product of this example may be characterized as including a very strong relative intensity line at 38.5±2.0 angstroms d-spacing and a weak line at 20.3±1.0 angstroms. TEM indicated that the product contained the present ultra-large pore material.

EXAMPLE 12

Figure 12:
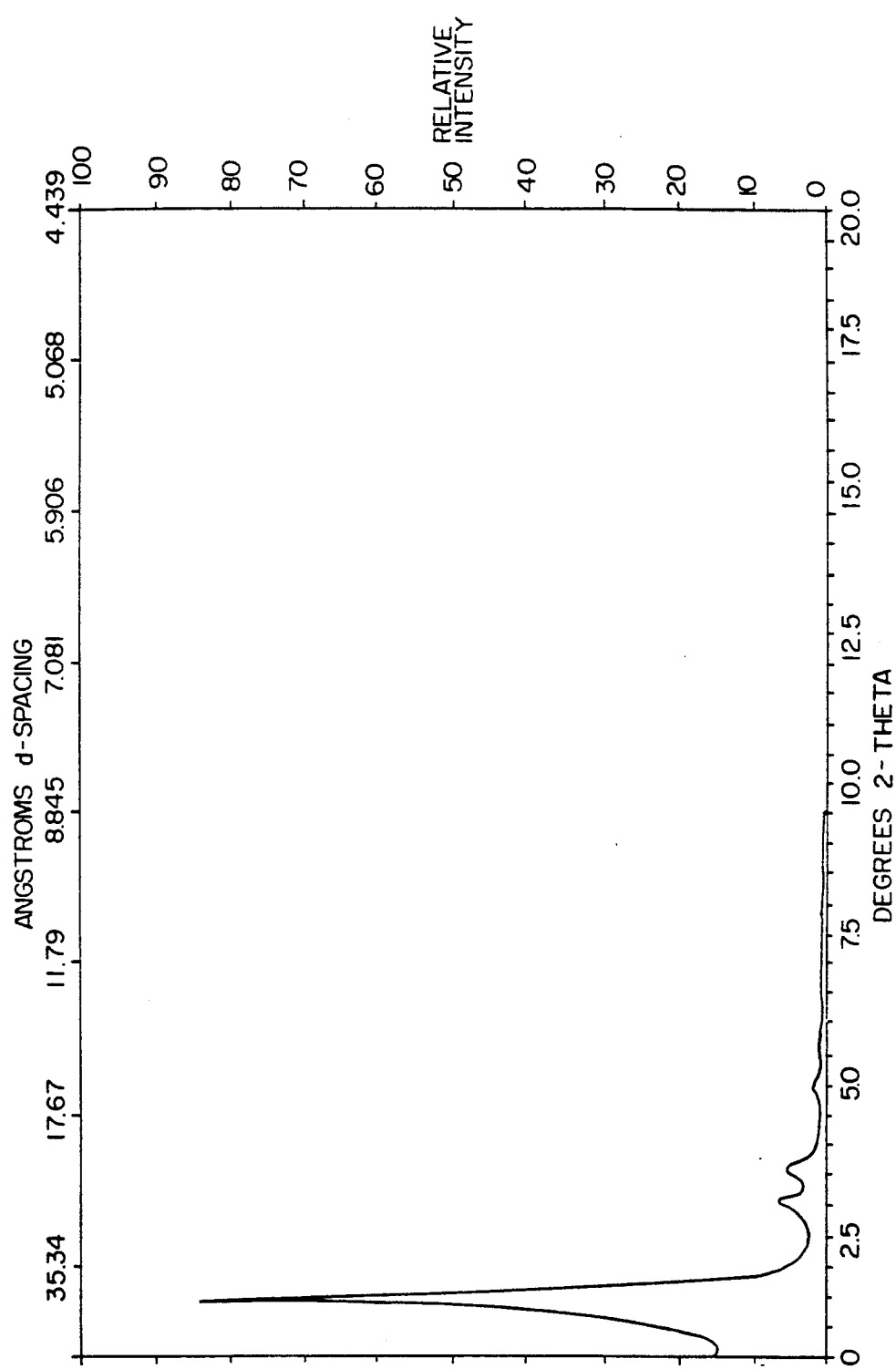

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole $Al_2O_3$:

1.25 moles $Na_2O$
27.8 moles $SiO_2$
5.1 moles $(CTMA)_2O$
4.40 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. TEM indicated that this product contained the present ultra-large pore material. The X-ray diffraction pattern of the calcined product of this example is shown in FIG. 12. This pattern can be characterized as including a very strong relative intensity line at 44.2±2.0 angstroms d-spacing and weak lines at 25.2±1.5 and 22.0±1.0 angstroms.

The calcined product proved to have a surface area of 932 m²/g and the following equilibrium adsorption capacities in grams/100 grams:

| | |
|---|---|
| H₂O | 39.3 |
| Cyclohexane | 46.6 |
| n-Hexane | 37.5 |
| Benzene | 50 |

The product of this example was then ammonium exchanged with 1 N $NH_4NO_3$ solution, followed by calcination at 540° C. for 10 hours in air.

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

1.25 moles $Na_2O$
27.8 moles $SiO_2$
5.1 moles $(CTMA)_2O$
4.4 moles $(TMA)_2O$
650 moles $H_2O$ The resulting solid product was recovered by filtration and dried in air at ambient temperature. The product was then calcined at 540° C. for 1 hour in nitrogen, followed by 6 hours in air.

The calcined product proved to have the following equilibrium adsorption capacities in grams/100 grams:

| | |
|---|---|
| H₂O | 35.2 |
| Cyclohexane | >50 |
| n-Hexane | 40.8 |
| Benzene | 53.5 |

Figure 13:
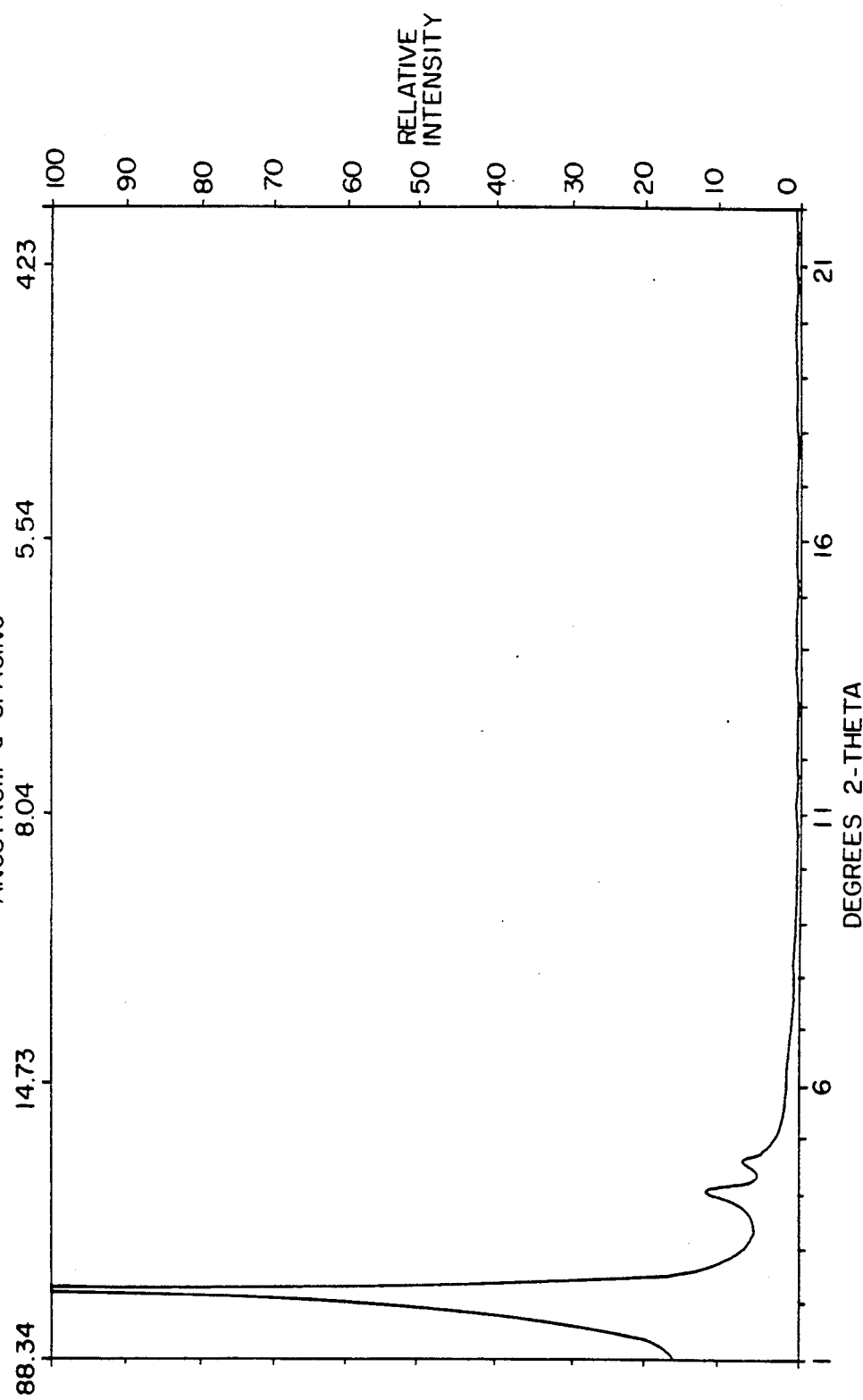

The X-ray diffraction pattern of the calcined product of this example is shown in FIG. 13. This product may be characterized as including a very strong relative intensity line at 39.1±2.0 angstroms d-spacing and weak lines at 22.4±1.0 and 19.4±1.0 angstroms. TEM indicated that this product contained the present ultra-large pore material.

The product of this example was then ammonium exchanged with 1 N $NH_4NO_3$ solution, followed by calcination at 540° C. for 10 hours in air.

EXAMPLE 14

A mixture of 125 grams of 29% CTMA chloride aqueous solution, 200 grams of water, 3 grams of sodium aluminate (in 50 grams $H_2O$), 65 grams of Ultrasil, amorphous precipitated silica available from PQ Corporation, and 21 grams NaOH (in 50 grams $H_2O$) was stirred thoroughly and crystallized at 150° C. for 168 hours. The reaction mixture had the following relative molar composition in terms of moles per mole silica:

0.10 moles $(CTMA)_2O$
21.89 moles $H_2O$
0.036 moles $NaAlO_2$
0.53 moles NaOH

The solid product was isolated by filtration, washed with water, dried for 16 hours at room temperature and calcined at 540° C. for 10 hours in air.

The calcined product proved to have a surface area of 840 m²/g, and the following equilibrium adsorption capacities in grams/100 grams:

| | |
|---|---|
| H₂O | 15.2 |
| Cyclohexane | 42.0 |
| n-Hexane | 26.5 |
| Benzene | 62 |

Figure 14:
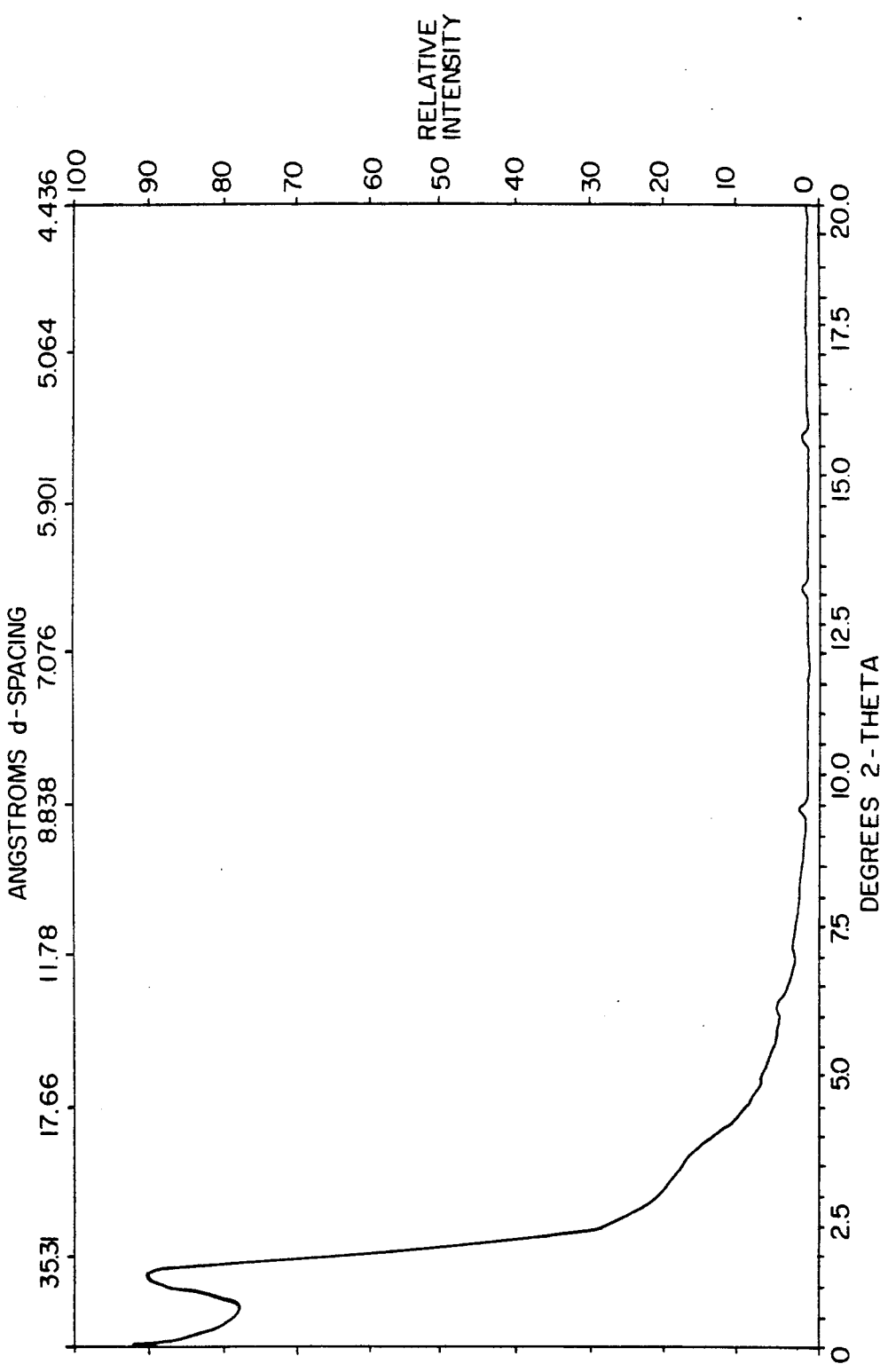

The X-ray diffraction pattern of the calcined product of this Example, shown in FIG. 14, may be characterized as including a very strong relative intensity line at 40.5±2.0 angstroms d-spacing. TEM indicated that the product contained the present ultra-large pore material.

EXAMPLE 15

For comparison purposes, a commercially prepared ultra-stable zeolite Y was obtained. It had a benzene equilibrium adsorption capacity of 20.7 grams/100 grams. Its X-ray diffraction pattern had all the lines of zeolite Y with its highest value peak at about 14.0 angstroms d-spacing.

EXAMPLE 16

To make the primary template mixture for this example, 240 grams of water was added to a 92 gram solution of 50% dodecyltrimethylammonium hydroxide, 36% isopropyl alcohol and 14% water such that the mole ratio of Solvent/$R_2/O$ was 155. The mole ratio of $H_2O/R_2/O$ in this mixture was 149 and the IPA/$R_2/O$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution. The mole ratio of $R_2/O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

0.05 mole $Na_2O$
0.036 mole $Al_2O_3$
0.18 mole $(C_{12}TMA)_2O$
0.12 mole $(TMA)_2O$
36.0 moles $H_2O$
1.0 mole IPA The resulting solid product was recovered by filtration, washed with water and dried in air at ambient temperature. The product was then calcined at 540° C. for 1 hour in nitrogen, followed by 6 hours in air.

The calcined product proved to have a surface area of 1223 m²/g and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

Figure 15:
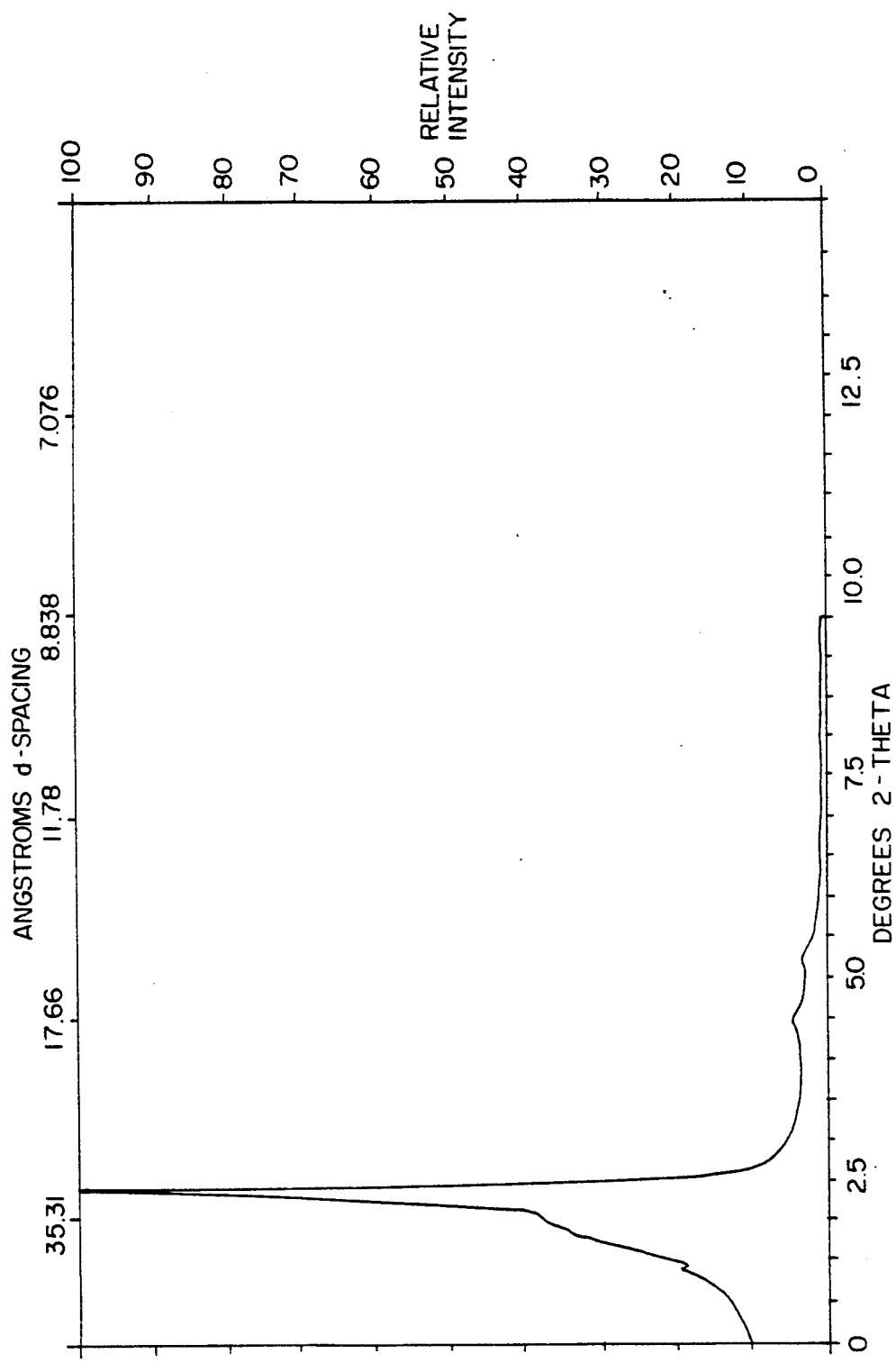

The X-ray diffraction pattern of the calcined product of this example is shown in FIG. 15. This product may be characterized as including a very strong relative intensity line at 30.8±1.5 angstroms d-spacing and weak lines at 17.9±1.0 and 15.5±1.0 angstroms. TEM indicated this product to contain the present ultra-large pore material.

EXAMPLE 17

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

0.81 mole $(C_{10}TMA)_2O$
47.6 moles $H_2O$

The resulting solid product was filtered and washed several times with warm (60°-70° C.) distilled water and with acetone. The final product was calcined to 538° C. in $N_2$/air mixture and then held in air for about 8 hours.

The calcined product proved to have a surface area of 915 m²/g and an equilibrium benzene adsorption capacity of 35 grams/100 grams. Argon physisorption data indicated an argon uptake of 0.34 cc/gram, and a pore size of 15 angstroms.

The X-ray diffraction pattern of the calcined product of this example may be characterized as including a very strong relative intensity line at 27.5±1.5 angstroms d-spacing and weak lines at 15.8±1.0 and 13.7±1.0 angstroms. TEM indicated that the product of this example contained the present ultra-large pore material.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
80.53 moles 1,3,5-trimethylbenzene The resulting product was filtered and washed several times with warm (60°-70° C.) distilled water and with acetone. The final product was calcined to 538° C. in $N_2$/air mixture and then held in air for about 10 hours.

The calcined product proved to have an equilbrium benzene adsorption capacity of >25 grams/100 grams.

The X-ray diffraction pattern of the calcined product of this example may be characterized as including a broad, very strong relative intensity line at about 102 angstroms d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 angstroms d-spacing and about 120 angstroms d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
132.7 moles 1,3,5-trimethylbenzene The resulting product was filtered and washed several times with warm (60°-70° C.) distilled water and with acetone. The final product was calcined to 538° C. in $N_2$/air mixture and then held in air for about 10 hours.

The calcined product proved to have a surface area of 915 $m^2$/g and an equilbrium benzene adsorption capacity of >25 grams/100 grams. Argon physisorption data indicated an argon uptake of 0.95 cc/gram, and a pore size centered on 78 angstroms (Dollimore-Heal Method, see Example 22(b)), but running from 70 to greater than 105 Angstoms.

The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product of this example contained several materials with different $d_{100}$ values as observed in their electron diffraction patterns. These materials were found to possess $d_{100}$ values between about 85 angstroms d-spacing and about 110 angstroms d-spacing.

EXAMPLE 20

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
650 moles $H_2O$
19.9 moles 1,3,5-trimethylbenzene The resulting product was filtered and washed several times with warm (60°-70° C.) distilled water and with acetone. The final product was calcined to 538° C. in $N_2$/air mixture and then held in air for about 8 hours.

The calcined product proved to have a surface area of 975 $m^2$/g and an equilbrium benzene adsorption capacity of >40 grams/100 grams. Argon physisorption data indicated an argon uptake of 0.97 cc/gram, and a pore size of 63 angstroms (Dollimore-Heal Method, see Example 22(b)), with the peak occurring at $P/P_o=0.65$.

The X-ray diffraction pattern of the calcined product of this example may be characterized as including a very strong relative intensity line at 63±5 angstroms d-spacing and weak lines at 36.4±2.0, 31.3±1.5 angstroms and 23.8±1.0 angstroms d-spacing. TEM indicated that the product of this example contained the present ultra-large pore material.

EXAMPLE 21

For catalytic evaluation of these materials, final products from Examples 1 through 15 were evaluated for dealkylation of tri-tert-butylbenzene (TBB) to di-tert butylbenzene. The present evaluation was conducted under one or both of two sets of conditions: (i) at a temperature of 225° C., weight hourly space velocity of 100 $hr^{-1}$ or (ii) at a temperature of 200° C., weight hourly space velocity of 200 $hr^{-1}$. Pressure was atmospheric. The feed was composed of 6.3/93.7 TTBB/toluene. Conversion was measured at 30 minutes on stream.

The results were as follows:

| Catalyst of | Conversion, wt. % | |
|---|---|---|
| Example | 225° C./100 $hr^{-1}$ | 200° C./200 $hr^{-1}$ |
| 1 | 0 | — |
| 2 | 6.2 | — |
| 3 | 53.9 | — |
| 4 | 10.4 | — |
| 5 | 68.9 | — |
| 6 | 100.0 | — |
| 7 | 93.4 | 66.0 |
| 8 | 5.3 | — |
| 9 | — | 61.2 |
| 10 | — | 58.9 |
| 11 | 86.3 | — |
| 12 | 96.7 | — |
| 13 | 92.8 | — |
| 14 | — | 37.7 |
| 15 | 12.0 | 0 |

EXAMPLE 22(a)

Argon Physisorption For Pore Systems Up to About 60 Angstroms Diameter

To determine the pore diameters of the products of this invention with pores up to about 60 angstroms in diameter, 0.2 gram samples of the products of Examples 1 through 17 were placed in glass sample tubes and attached to a physisorption apparatus as described in U.S. Pat. No. 4,762,010, which is incorporated herein by reference.

Figure 16:
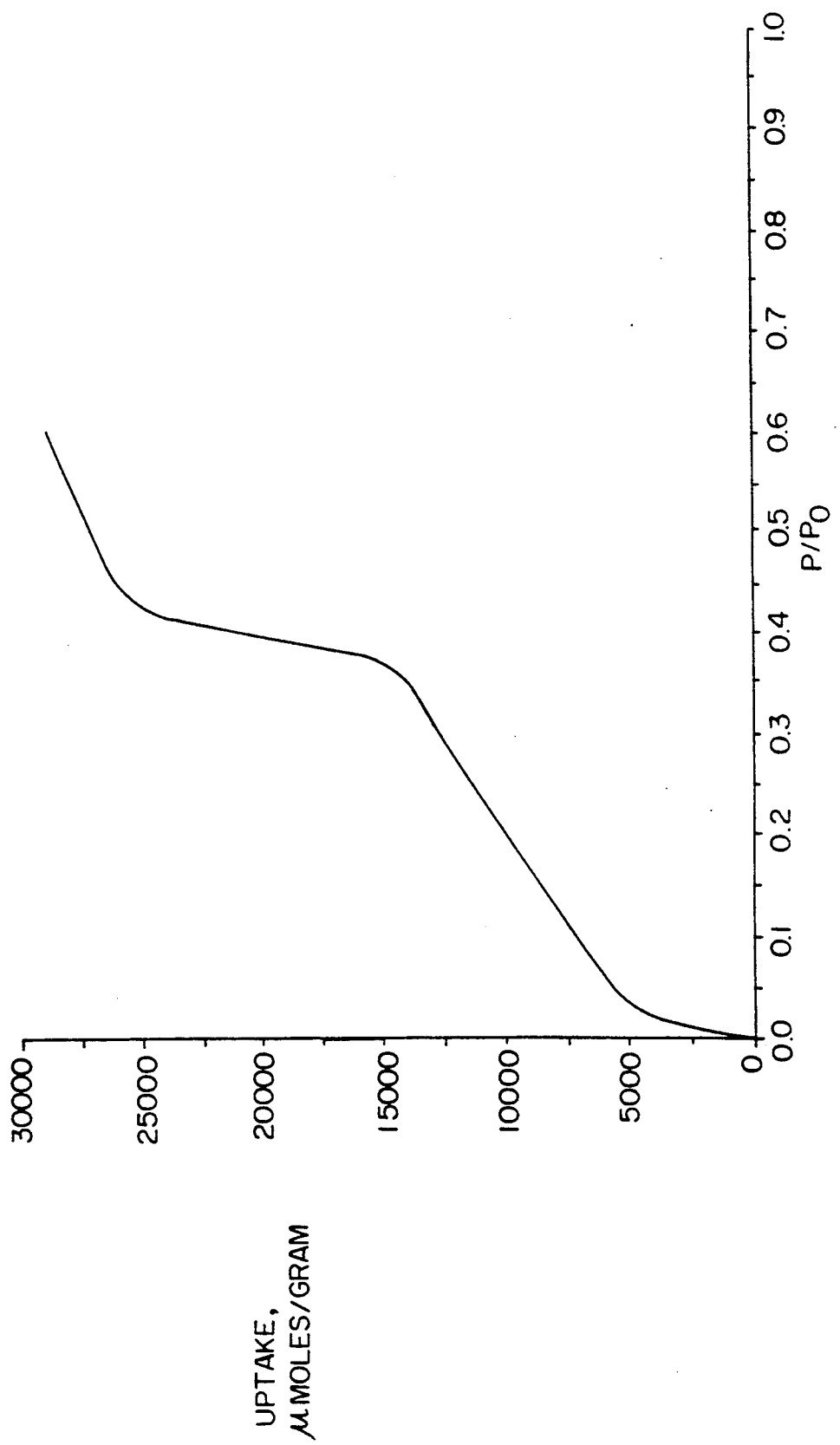
FIG. 16 is an isotherm plot of physisorption measurements from Example 22.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., Adsorption, Surface Area and Porosity, 2nd ed., Academic Press, 1982). In each instance, a graph of the amount adsorbed versus the relative pressure above the sample, at equilibrium, constitutes the adsorption isotherm as shown in FIG. 16 for the Example 4 product sample. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

Figure 17:
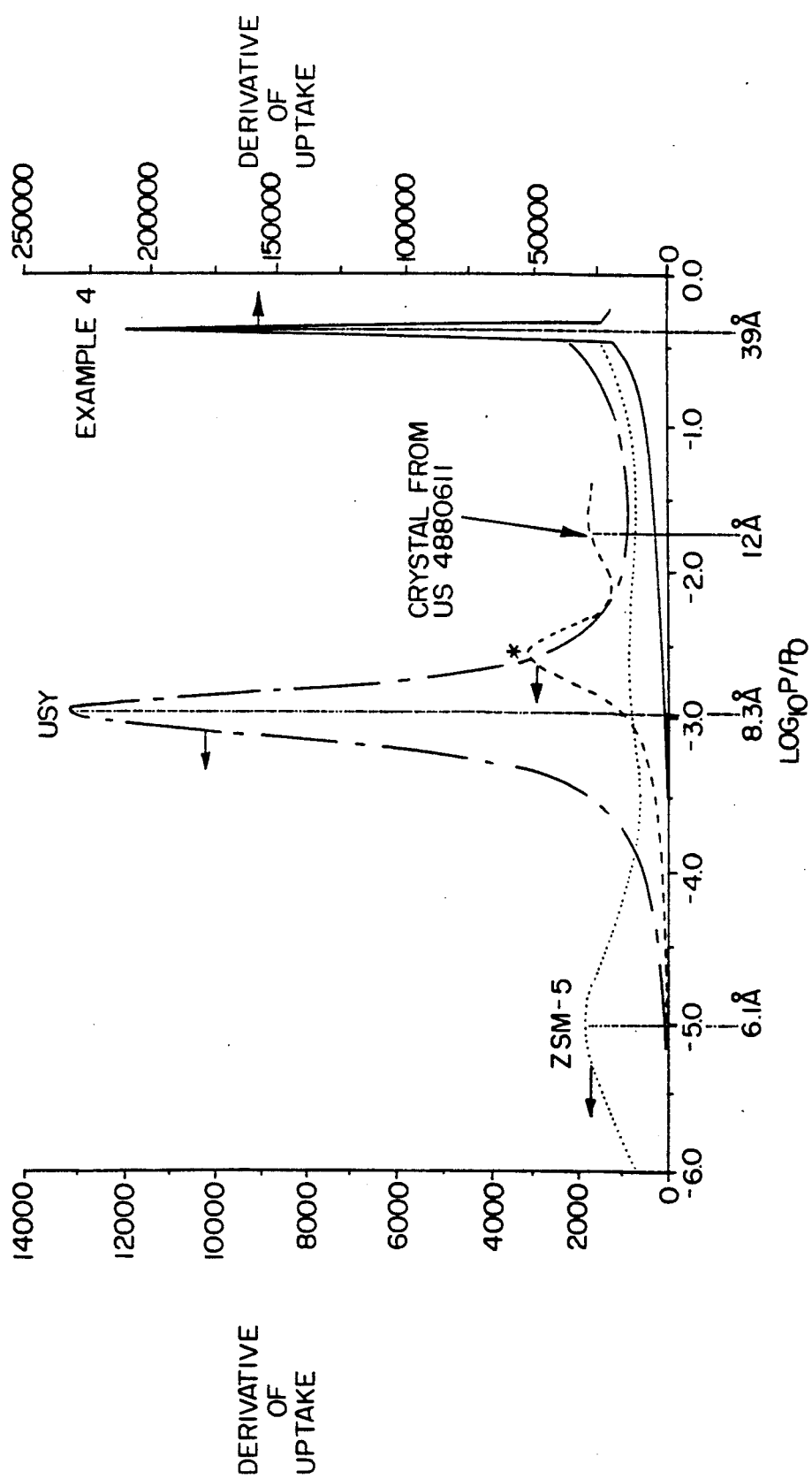
FIG. 17 is a plot of physisorption measurements from Example 22 showing pore sizes of various crystalline materials.
Figure 18:
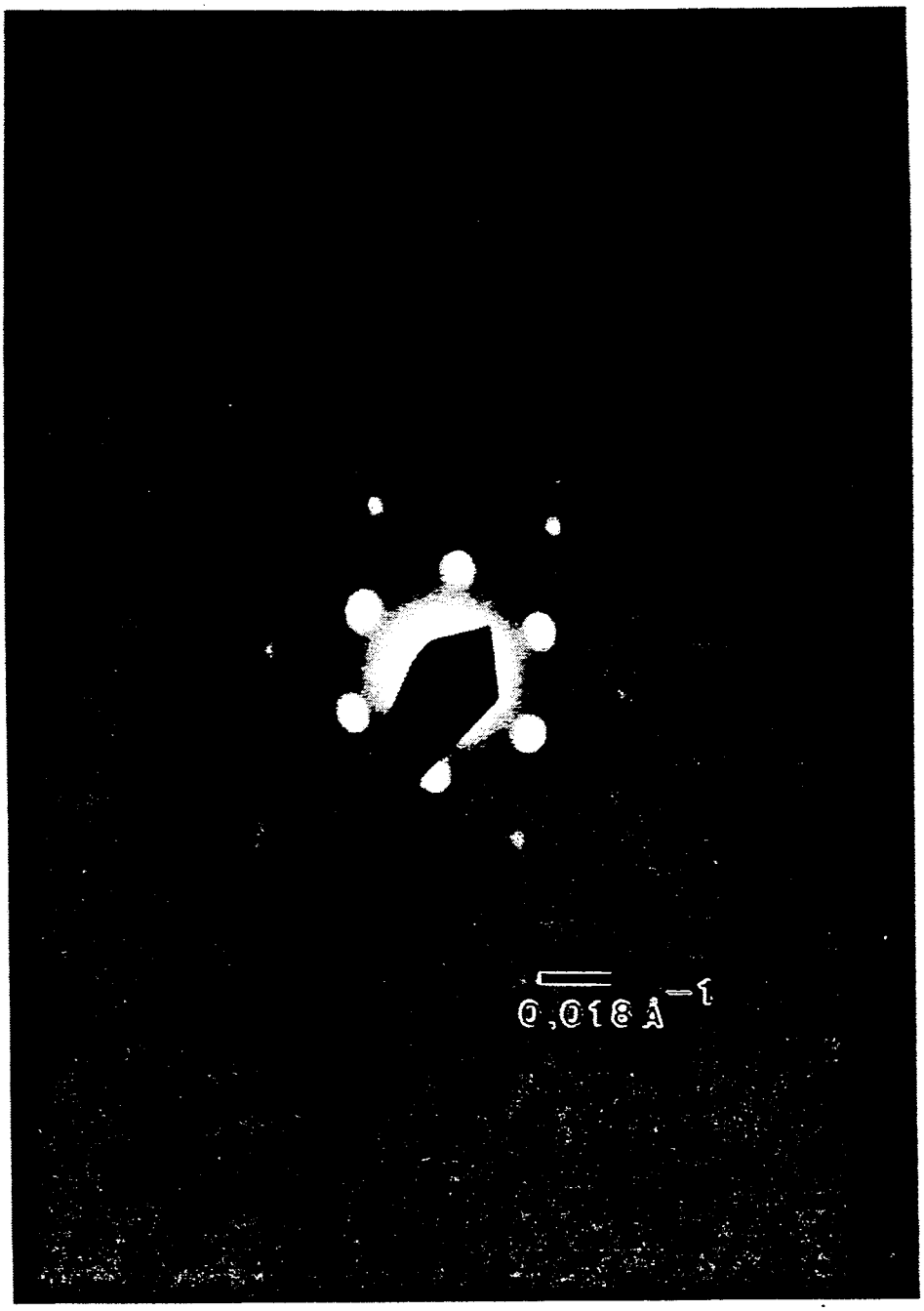
FIG. 18 is an electron diffraction pattern of the product of Example 4.
Figure 19:
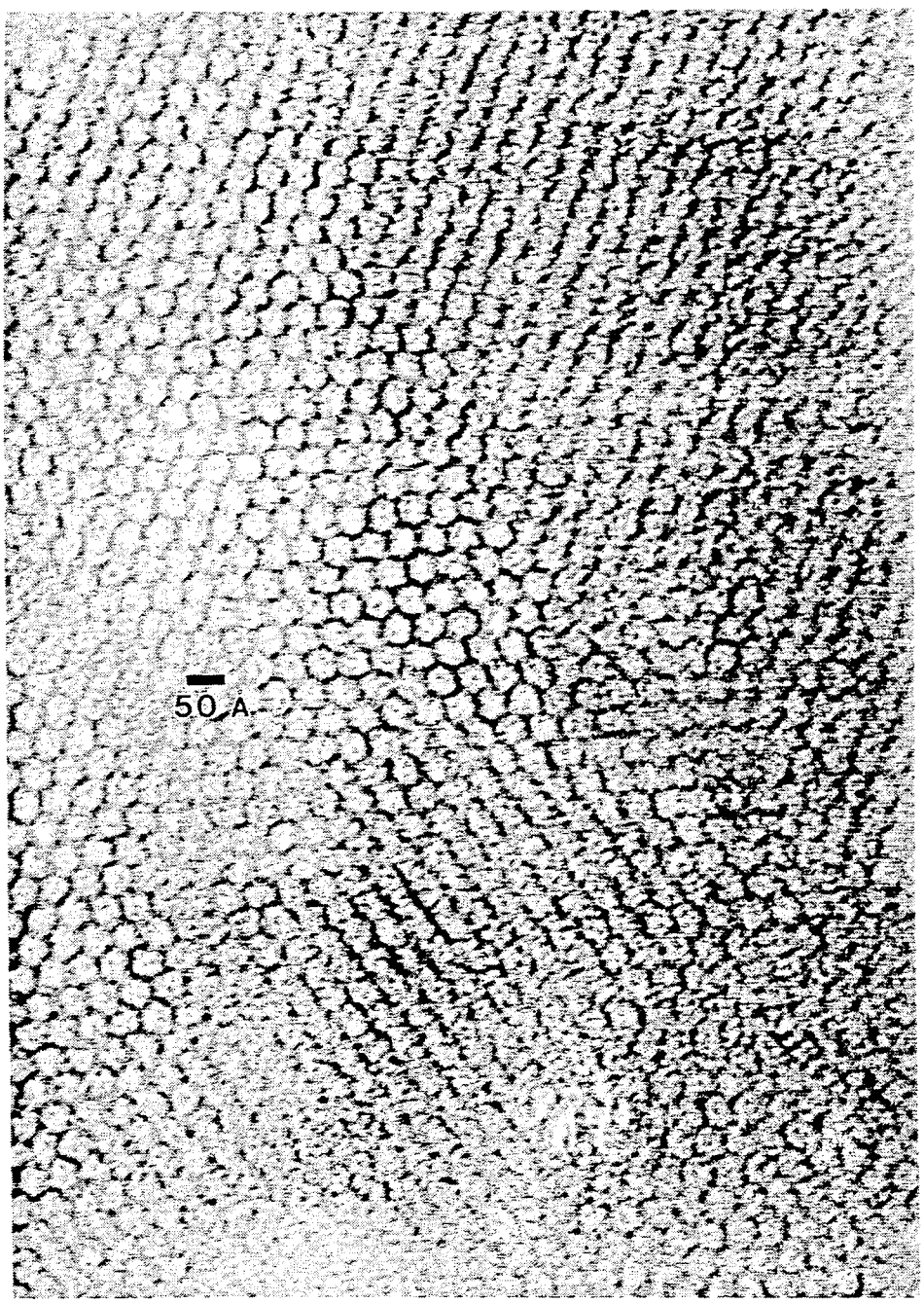
FIG. 19 is a transmission electron micrograph of the product of Example 4.
Figure 20:
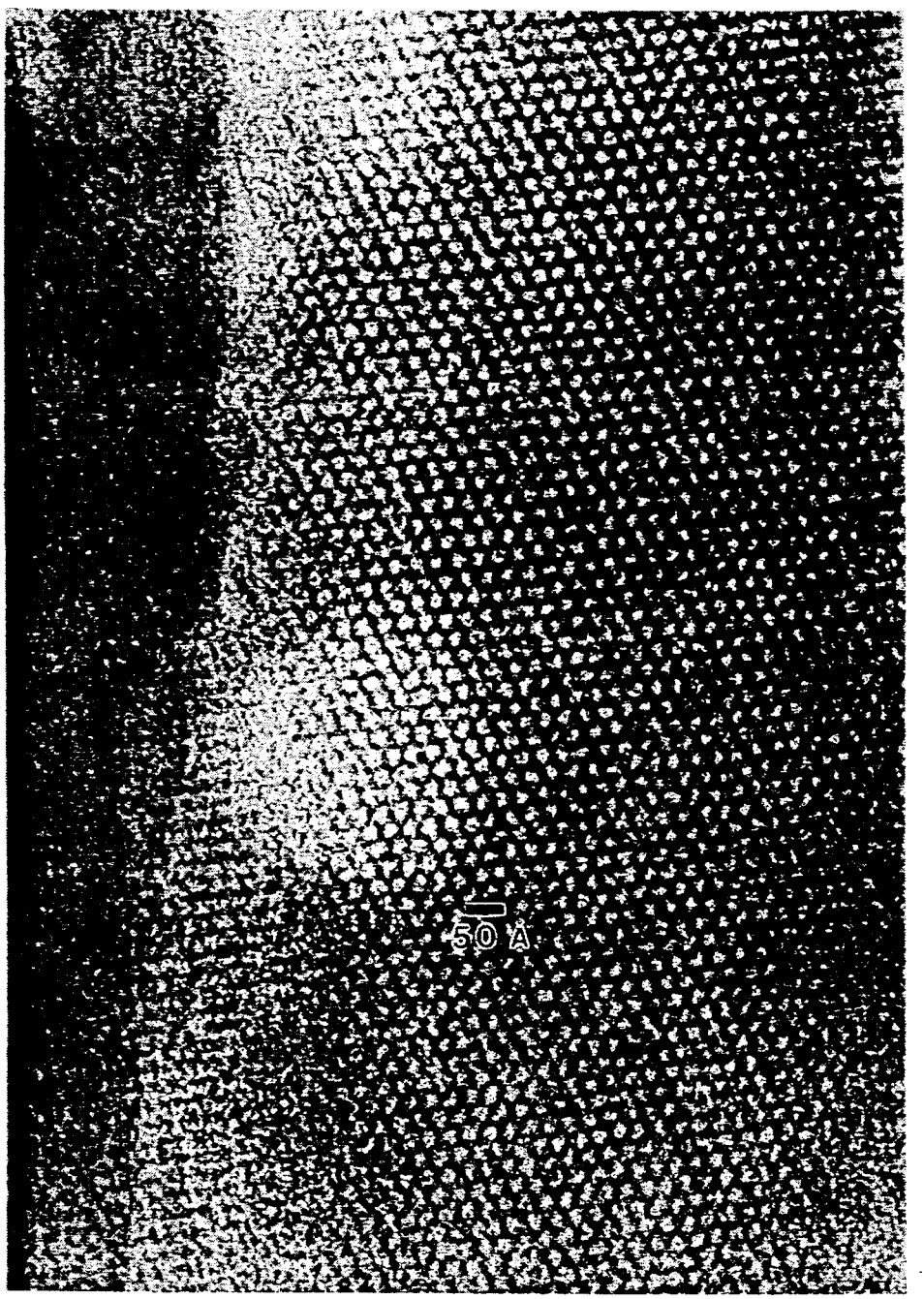
FIG. 20 is a transmission electron micrograph of the product of Example 5.
Figure 21:
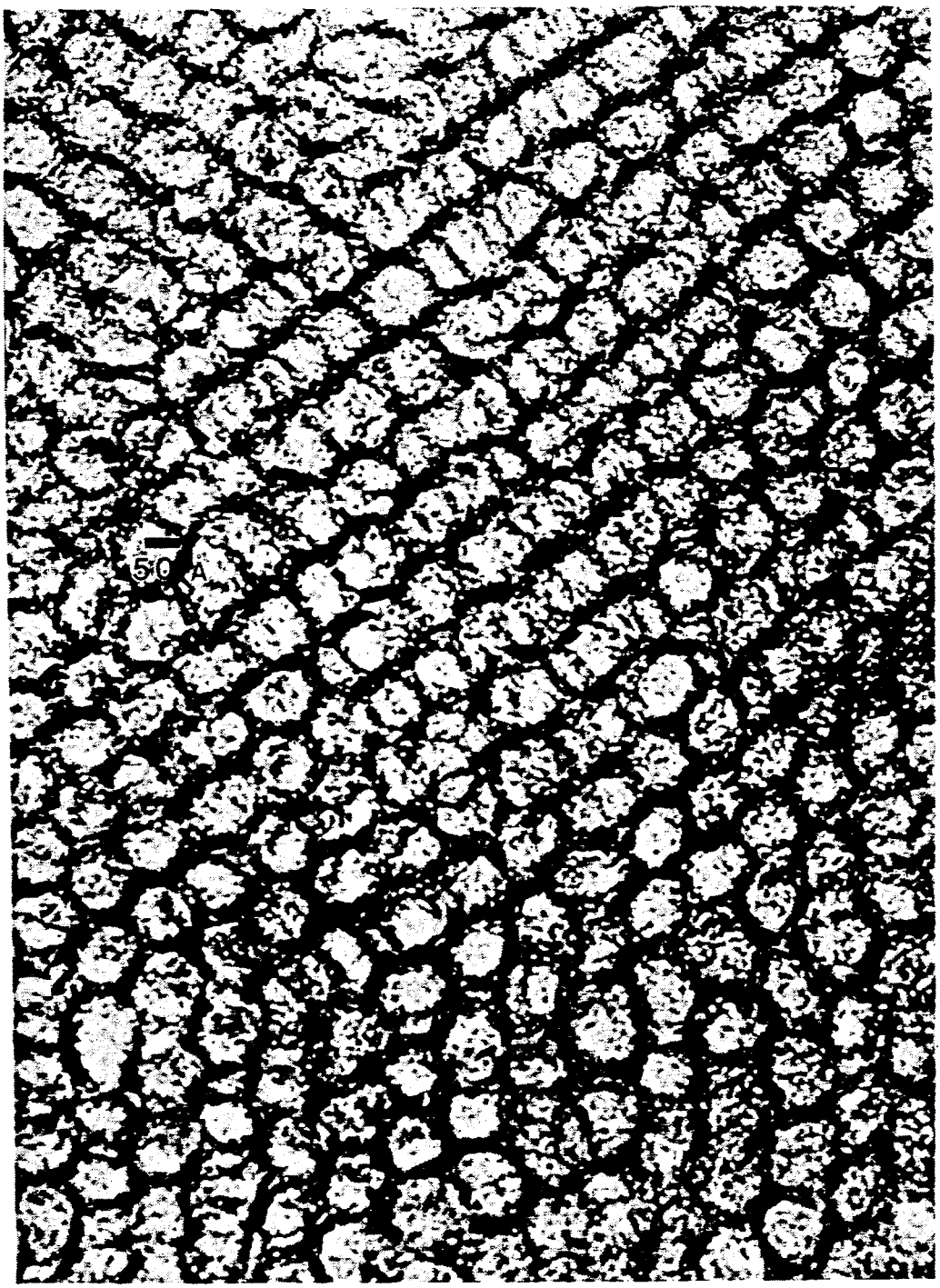
FIG. 21 is a transmission electron micrograph of the product of Example 19.

The step (inflection) in the isotherm, in this case (Example 4 product) at about $P/P_o=0.4$, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. This is shown in FIG. 17. Also shown in FIG. 17 are data obtained in an identical fashion for a crystalline material from U.S. Pat. No. 4,880,611 and several other crystal materials. There is further provided a physical scale on the axis which converts the position of an adsorption peak in terms of log $(P/P_o)$ to the physical pore diameter in angstroms. This conversion was obtained by using the following formula:

$$\log(P/P_o) = \frac{K}{d - 0.38} \left( \frac{S^4}{3(L - D/2)^3} - \frac{S^{10}}{9(L - D/2)^9} - \frac{S^4}{3(D/2)^3} + \frac{S^{10}}{9(D/2)^9} \right)$$

wherein d = pore diameter in nanometers, K = 32.17, S = 0.2446, L = d + 0.19, and D = 0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 angstroms in diameter.

As is indicated in FIG. 17, the pore size of the material of Example 4 is 39.6 angstroms with the peak occurring at log $(P/P_o) = -0.4$ or $P/P_o = 0.4$, while the pore size of the material from U.S. Pat. No. 4,880,611 is 12 angstroms or $P/P_o=0.02$. In the other materials, a peak is observed at $P/P_o=0.015$ which is denoted by an asterisk in FIG. 17. This peak reflects adsorption on the walls of the pores and is not otherwise indicative of the size of the pores of a given material. A value of $P/P_o$ of 0.03 corresponds to 13 angstroms pore size.

The results of this procedure for the samples from Examples 1 through 17 are tabulated below. The samples from Examples 10, 13 and 16 gave two separate peaks, believed to be the result of two separate ultra-large pore phases in the products.

| Examples | Pore Diameter, Angstroms |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |

-continued

| Examples | Pore Diameter, Angstroms |
|---|---|
| 10 | 22.8, 30.8 |
| 11 | 36.8 |
| 12 | 36.1 |
| 13 | 35.0, 42.1 |
| 14 | 40.0 |
| 15 | 8.3 |
| 16 | 22.4, 30.4 |
| 17 | 15.0 |

EXAMPLE 22(b)

Argon Physisorption For Pore Systems Over About 60 Angstrom Units Diameter

In the pore regime above 60 Angstrom Units diameter, the Kelvin equation can be applied. It is usually given as:

$$\ln(P/P_o) = \frac{-2\gamma V}{r_k RT} \cos\theta$$

where:
$\gamma$ = surface tension of sorbate
V = molar volume of sorbate
$\theta$ = contact angle (usually taken for practical reasons to be 0)
R = gas constant
T = absolute temperature
$r_k$ = capillary condensate (pore) radius
$P/P_o$ = relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom Units diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem.*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

The products of Examples 18 and 19 were subjected to the Dollimore and Heal Method for argon physisorption data, as indicated.

CORE

The core comprises at least 10 wt % of at least 1 molecular sieve, having openings comprising a 12 or less-membered ring, e.g., zeolite Y, or shape-selective zeolites as hereinafter described, and said core further having a reduced, if any, content of a molecular sieve having openings of at least 8 angstroms, relative to such molecular sieve's concentration in the shell. The core can also contain both a shape selective paraffin cracking/isomerization component, preferably HZSM-5 and a shape selective aliphatic aromatization catalyst, preferably GaZSM-5.

Molecular Sieves Having Openings Comprising a 12 or Less-Membered Ring

The above molecular sieve cracking component may be a conventional zeolite. Some of these, and patents describing their preparation are discussed hereinafter. Zeolite L, zeolite X, zeolite Y, and preferably higher silica forms of zeolite Y such as Dealuminized Y (DAY; U.S. Pat. No. 3,442,795), Ultrastable Y (USY; U.S. Pat. No. 3,449,070), Ultrahydrophobic Y (UHP-Y; U.S. Pat. No. 4,331,694, U.S. Pat. No. 4,401,556), and similar materials are preferred for use herein. Zeolite beta (U.S. Pat. No. 3,308,069) ZSM-18 (U.S. Pat. No. 3,950,496), ZSM-20 (U.S. Pat. No. 3,972,983), Zeolite L (U.S. Pat. No. 3,216,789; U.S. Pat. No. 4,544,539; U.S. Pat. No. 4,554,146 and U.S. Pat. No. 4,701,315) may also be used. These materials may be subjected to conventional treatments, such as impregnation or ion exchange with rare earths to increase stability. These patents are incorporated herein by reference.

The present invention further contemplates shape-selective molecular sieve materials, described below, as included in the term "molecular sieves having openings comprising a 12 or less-membered ring."

SHAPE SELECTIVE COMPONENT

The preferred, but optional, shape selective paraffin cracking/isomerization component can be any shape selective zeolite which at the conditions experienced in a catalytic cracking unit promotes formation of olefinic and/or iso-olefinic materials. Any zeolite having a Constraint Index of 1–12 can be used herein, but ZSM-5 is especially preferred. A description of Constraint Index and its measurement is set out in U.S. Pat. No. 4,556,477, incorporated herein by reference.

Preferred shape selective zeolites are exemplified by ZSM-5, ZSM-11, ZSM-12, ZSM-22, ZSM-23, ZSM-35, ZSM-48, ZSM-57 MCM-22 and similar materials.

ZSM-5 is described in U.S. Pat. No. 3,702,886, U.S. Pat. No. Reissue 29,948 and in U.S. Pat. No. 4,061,724 (describing a high silica ZSM-5 as "silicalite").
ZSM-11 is described in U.S. Pat. No. 3,709,979.
ZSM-12 is described in U.S. Pat. No. 3,832,449.
ZSM-22 is described in U.S. Pat. No. 4,556,477.
ZSM-23 is described in U.S. Pat. No. 4,076,842.
ZSM-35 is described in U.S. Pat. No. 4,016,245.
ZSM-48 is described in U.S. Pat. No. 4,397,827.
ZSM-57 is described in U.S. Pat. No. 4,973,781.
MCM-22 is described in U.S. Pat. No. 4,954,325.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such zeolites include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ratio of 70/1, 100/1, 500/1 or even higher.

Preferably, the shape selective paraffin cracking/isomerization zeolite is placed in the hydrogen form by conventional means, such as exchange with ammonia and subsequent calcination. The zeolite may be used in any form which promotes paraffin upgrading.

The preferred, but optional, shape selective aromatization component can be any zeolite having a Constraint Index of 1–12 and additional components which promote paraffin aromatization at catalytic cracking conditions.

Gallium exchanged or impregnated ZSM-5 is especially preferred for use herein because of its ability to convert light paraffins such as propanes and butanes into aromatic hydrocarbons which are valuable as petrochemicals or as high octane gasoline blending components. Gallium may be incorporated into the zeolite framework during synthesis or it may be exchanged or impregnated or otherwise incorporated into the ZSM-5 after synthesis. Preferably 0.05 to 10, and most preferably 0.1 to 2.0 wt. % gallium is associated with the aromatization zeolite.

On a matrix free basis, the relative ratios of the preferred three component zeolite core can vary greatly, depending on feedstocks, products desired, and to a lesser extent on catalytic cracking conditions.

In general, the function of the larger pore cracking components comprising a molecular sieve, for example those having openings comprising a 12-membered ring, is bulk conversion of heavy feed or of cracked asphaltenes or other large cracked products to lighter materials, including light paraffins and light olefins in the $C_2$–$C_{10}$ range.

The light paraffins are not preferred products. The $C_5^+$ paraffins tend to be relatively low in octane number. They can be upgraded by conventional means such as platinum reforming, but this increases costs. There is a significant yield loss during reforming, and reliance on reforming tends to increase the aromatics content of the gasoline pool.

The shape selective zeolite cracking/isomerization catalyst converts a significant portion of these paraffins to olefins and iso-olefins, with higher octane number, in the case of the $C_5^+$ olefins, and more reactivity in the case of the $C_4^-$ olefins.

The light olefins produced by the shape selective cracking/isomerization catalyst and by the large pore cracking catalyst can be easily upgraded in conventional alkylation units. Alkylation conditions and procedures are set out in U.S. Pat. No. 4,918,255, incorporated herein by reference. In addition, the iso-olefins can be processed in etherification units to high octane oxygenates such as MTBE or TAME. Etherification procedures and conditions are set out in U.S. Pat. No. 4,886,925, incorporated herein by reference. By increasing the amount of shape selective cracking/isomerization catalyst present in the layered catalyst, it is possible to enhance the production of $C_2$–$C_{10}$ olefins and, via subsequent alkylation or etherification steps, increase gasoline yields and octane number, with aliphatic components rather than aromatic components.

The shape selective aromatization zeolite converts $C_{10}^-$ paraffins, and especially $C_4^-$ paraffins, to aromatics. The aromatics produced, primarily benzene, toluene, and xylene (BTX) are extremely valuable both as petrochemicals and for use in enhancing the octane number of the gasoline pool.

Preferably the conventional, large pore cracking component comprising a molecular sieve having openings comprising a 12-membered ring is present in the core in an amount ranging from two to four times the combined amount of shape selective paraffin cracking-/isomerization zeolite and shape selective paraffin aromatization zeolite. Thus, a catalyst whose core contains 45 wt. % RE-USY zeolite, 35 wt % matrix, 15 wt. % HZSM-5 and 5 wt. % GaZSM-5 will give very good results. Expressed as weight percent of total catalyst, the layered catalyst would have the following composition:

|  | Overall | Core wt. % | Shell wt. % |
|---|---|---|---|
| Shell | 20 wt. % | | |
| Core: | 80 wt. % | | |
| 1) MCM-41 - | 8 wt. % | 0 | 40 |
| 2) Matrix - | 35 wt. % | 35 | 35 |
| 3) USY - | 38 wt. % | 45 | 10 |
| 4) HZSM-5 - | 12 wt. % | 15 | 0 |
| 5) GaZSM-5 - | 4 wt. % | 5 | 0 |
| 6) MgO - | 3 wt. % | 0 | 15 |

CATALYST MANUFACTURE

Core

The core comprising one or more molecular sieves including one having openings comprising a 12 or less-membered ring e.g., zeolite Y, and some binder, should be prepared first.

The different zeolite components can be wet ball milled, jet milled or dry blended together, and then may be added to a suitable matrix, e.g., a silica-alumina gel, clay composite or an alumina-clay composite or a silica sol or other matrix such as a alumina rich sol and further mixed. The matrix and zeolite mixture can be extruded, prilled, marumerized, tabletted, dropped in an oil bath, etc. to form relatively large particles. For use in fluidized bed catalytic cracking units the matrix-zeolite mixture is preferably spray dried, but any other means can be used to make a fluidizable catalyst particle, such as crushing or grinding larger size extrudates or pills.

Layered Core

It is preferred, but not essential, to provide a layered core, with the large pore cracking component, such as zeolite Y, comprising the outermost layer of the core. The inner portion of the core can contain one or more of the shape selective, Constraint Index 1-12, zeolite catalysts for paraffin cracking/isomerization and/or for aromatization of aliphatics to aromatics.

In a preferred embodiment, the shape selective zeolite components, such as HZSM-5 and GaZSM-5 are mixed together with a conventional binder such as silica, or silica-alumina to form a first stage product. The first stage product should be then subjected to drying or calcination or other treatment to fix it in a stable enough form to maintain its integrity or green strength in subsequent steps, wherein the large pore molecular sieve cracking component is added as an external layer to the shape selective zeolite first stage product.

Shell

A shell can be added by taking the first stage product and spraying onto it a slurry to form a shell containing at least 5 wt % of a molecular sieve having openings of at least 8 angstroms.

The shell can be added by any other means which will add such a molecular sieve material-containing layer to the core material described above. In the case of an FCC catalyst, a spray dried core component can be sprayed with a slurry containing the requisite molecular sieve material as well as inorganic solids matrix material such as those selected from the group consisting of clay, silica, alumina and silica-alumina.

A uniform impregnation of a large preformed particle should be avoided, what is sought is coating, not impregnation. A preferred coating technique, and preferred equipment for carrying out the coating process, are discussed in Chapter 12 of Catalyst Manufacturer, A. B. Stiles, Marcel Dekker, Inc., 1983, which is incorporated herein by reference. The cores to be coated are placed in a rotating drum and a shell material "paint" is coated onto the core. The thickness of the paint layer is controlled by the amount of slurry which is coated on the cores. To build up a thicker core, multiple coating runs can be completed, or the coating apparatus, such as a Penwalt-F. J. Stokes coating pan, may be heated to permit continuous operation.

Yet another efficient way of adding a coating to the catalyst is the spherudizer. Spherudizing is a special technique of catalyst manufacture developed by the Dravo Corporation. A disk rotates at an angle while small spheres of a seed material (the core) are placed in the bottom part of the disk. A spray of a cohesive slurry of the shell is sprayed onto the smaller particles. A shell layer gradually forms and the spheres increase in size. By careful control of the size of the starting seeds, the rate of addition of the slurry shell material, and the rate of rotation of the disk, coated particles of a desired size can be obtained. Some experimentation may be necessary to determine the optimum core/shell formulation and preparation techniques using the spherudizer. Such routine experimentation is common to the use of the spherudizer, and well within those skilled in the catalyst manufacturing arts.

The shell can, and preferably does, have a dual role of protecting the inner shape selective zeolite-rich core, and of bringing about a measure of cracking of the extremely large molecules associated with heavy feeds. To promote some cracking of large molecules the shell contains a molecular sieve component having openings of at least 8 angstroms.

METAL CONTROL

The catalyst and process of the present invention permit significantly improved control of metal deposition rates on catalytic cracking catalysts as compared to prior art catalysts. The zeolite-rich core can be effectively protected from metals attack by use of a metallophilic or metal loving shell (such as alumina).

The operation can be best understood by discussing the use of an alumina and MCM-41 shell.

In this embodiment, a relatively soft, alumina-containing shell is used. Such materials have an extremely high affinity for metals such as nickel and vanadium which are usually present in residual feed stocks. The soft materials are subject to fairly high attrition rates, so that the metals will be rapidly captured by the alumina matrix and removed from the unit as catalyst "fines" as the soft alumina abrades or attrits during use. This aspect of the shell functions in a manner similar to an ablative heat shield on a re-entry vehicle, protecting the catalyst during repeated cycles through the cracking unit.

Use of a core matrix comprising a metal immobilizing compound, such as MgO, CaO, BaO, $La_2O_3$, $Ce_2O_3$ and similar alkaline and/or rare earth materials provides a further measure of protection. Any feed metals that penetrate the shell, or are deposited directly on the core because the shell is gone or damaged, will be neutralized by the core matrix if it contains a metal immobilizing compound. Incorporation of such materials in the shell is also beneficial, especially so when the shell is a relatively hard, durable material.

The core/shell catalyst of the present invention provides an efficient way of upgrading heavy, metals containing resids. The preferred, somewhat friable alumina-containing shell material acts as a throw-away scavenger to preferentially absorb metals from the feed. These preferred catalysts are to some extent renewed during use by the gradual removal of the preferred, relatively soft and readily attritable shell material.

Of course using a relatively soft alumina material results in greater catalyst attrition and catalyst loss. This is not totally undesirable, in that it is much better for the unit to experience relatively high attrition losses (and relatively high metals removal) and have a makeup catalyst rate which balances catalyst lost daily through attrition. This is a more efficient use of the core cracking catalyst for cracking resid than removing 1-2% or more, per day of the circulating catalyst inventory to maintain metals contamination on the catalyst at a tolerably low level and to keep the cracking catalyst activity at a sufficiently high level to permit efficient cracking.

ATTRITING METAL TRAP COATING

In one embodiment of the present invention, the shell comprises a surface coating which attrits and traps metal. A shell which is weakly bound to the catalyst attrits off during the catalytic cracking process to expose new sites of the coating. When the surface coating comprises at least one metals trapping component, it is possible to immobilize metals in the feed to the cracking unit on the surface coating, and to remove the metals from the cracking unit as the coating attrits off.

A preferred coating which acts in this way is a refractory porous material which comprises rare earth oxide, aluminum oxide and aluminum phosphate. Preferably the rare earth oxide, aluminum oxide and aluminum phosphate are present in a weight ratio of from about 10:20:70 to about 90:5:5, exclusive of the molecular sieve component. Such a coating is preferably sprayed or otherwise coated on the surface, rather than impregnated.

Other suitable coating materials include magnesia-alumina-aluminum phosphate gels, and tin (IV) oxide gels.

An especially preferred embodiment comprises, in addition to the required molecular sieve component, a coating of a gel of magnesia-alumina-aluminum phosphate (MAAP) or a gel of lanthana-alumina-aluminum phosphate (LAAP) on a core catalyst such as a conventional cracking catalyst comprising at least 10 and preferably 20 wt % zeolite Y, e.g., calcined REY, in a silica-alumina-clay matrix.

Use of at least 2 wt % coating, based on the weight of the finished composite, is preferred. Operation with 10 wt % of a coating, such as that including the LAAP gel discussed above, should allow a majority of the vanadium in a typical cat cracker feed to be trapped on the catalyst surface.

More details regarding these preferred coatings are contained in our U.S. Pat. No. 5,001,096.

EXAMPLES OF CATALYST PREPARATION

A layered catalyst is prepared by coating a core comprising a molecular sieve having openings comprising a 12 or less-membered ring, with a shell which comprises RE-USY zeolite, MCM-41 and an $Al_2O_3$/MgO matrix.

The core component is prepared according to the procedure described next. 900 parts by weight of Davison Z-14US, 300 parts of $NH_4$ZSM-5, 100 parts of GaZSM-5 (all on ignited basis), each in form of a 30% ballmilled slurry containing deagglomerated particles (95% L.T. 2 microns), are added together with 304 parts of 50% aluminum chlorhydrol (23% $Al_2O_3$, 8% Cl, Reheis Co.) and 630 parts of Kaolin clay (ignited basis, Georgia Kaolin) in a Nalgene container containing 1400 parts of DI water. The mixture is subjected to high shear conditions using a Cowles Dissolver (Morehouse Industries; Fullerton, Calif.) equipped with a 6.5"blade turning at 700-800 rpm for 30 minutes to prepare a pre spray-dryer slurry. The solids content of the slurry is adjusted between 25-40% using additional DI water, as necessary. Also, the slurry pH is adjusted between 4.0-4.6 using 20% $H_2SO_4$ or 50% $NH_4OH$, as necessary. The slurry is then spray-dried at 370° F. outlet temperature. The spray dryer (Komline-Sanderson; Peapack, N.J.) is operated at 5.5 psig air pressure with 0.06"nozzle at 250 cc/minute feed rate using a Moyno feed pump (Springfield, Ohio). The spray dried particles are air calcined for 2 hours at 1000° F. in a muffle furnace. Subsequently, the core component is first column exchanged with 1.0N $NH_4NO_3$ solution followed by a slurry exchange using a solution containing 0.75% rare earth chlorides (prepared from 60% AR solution, Davison Specialty Chemicals). Both exchanges are carried out at 5/1, solution/core weight ratio. The core is next dried at 250° F. overnight before use. The nominal core composition is 45% RE-USY (Z-14US), 15% HZSM-5, 5% GaZSM-5 and 35% matrix (10% alumina binder, 90% clay).

The shell component is first prepared in the precursor form as described next. 75 parts (MgO basis) $Mg(NO_3)_2·6H_2O$ are dissolved in 500 parts DI water. This solution is added to a slurry of 76 parts of 50% aluminum chlorhydrol (23% $Al_2O_3$, 8% Cl, Reheis Co.) and 157.5 parts of kaolin clay (ignited basis, Georgia Kaolin) slurried in a Nalgene container with 300 parts water. The pH of the MgO/alumina/clay slurry is adjusted to 4.0-4.6 using $HNO_3$ (20%) on $NH_4OH$ (50%) as needed. The slurry is filtered and washed (5 vol/vol DI $H_2O$) and then reslurried at 5% solids level with 250 parts MgO/$Al_2O_3$, 50 parts Davison Z-14US and 200 parts MCM-41, all on an ignited basis.

Using Yamato Model GA-21 Fluidized Bed Spray Granulator Dryer, 50 parts (ignited basis) of the shell precursor is sprayed into a heated (200° C.) fluid bed of 200 parts of the core component to prepare the layered catalyst. Additional batches of the layered catalyst are prepared in the same manner.

PROCESSES

As noted earlier, the layered catalytic cracking catalyst comprising a core and a shell can be used in a process for catalytic cracking of a hydrocarbon feed boiling in the gas oil or heavier range to lighter products. The feed is contacted with a layered catalytic cracking catalyst comprising a core and a shell, said shell comprising at least 5 wt % of at least 1 molecular sieve having openings of at least 8 angstroms and said core comprising at least 10 wt % of at least 1 molecular sieve having openings comprising a 12 or less-membered ring and said core further having a reduced, if any, content of said molecular sieve having openings of at least 8 angstroms, relative to its concentration in the shell, in a catalytic cracking reactor at catalytic cracking conditions.

In one process embodiment, the catalyst core further comprises 5 to 20 wt % of a molecular sieve having a Constraint Index of 1-12 and said lighter products comprise $C_2$-C10 olefins which are upgraded via subsequent alkylation or etherification. Suitable alkylation conditions and procedures are set out in U.S. Pat. No. 4,918,255, incorporated herein by reference. Etherification procedures and conditions are set out in U.S. Pat. No. 4,886,925, incorporated herein by reference.

In another process embodiment of the invention, a separate additive catalyst comprising a zeolite characterized by a Constraint Index of 1-12, e.g., ZSM-5, is added to the layered catalytic cracking catalyst. Such additive catalyst provides an octane and total yield improvement in catalytic cracking. Further disclosure of conditions relating to such catalytic cracking catalyst additives is set out in U.S. Pat. No. 4,309,279, incorporated herein by reference.

Yet another process embodiment of the invention utilizes 0.01 to 100 ppm, based on total catalyst inventory, of at least one metal of the group consisting of platinum, palladium, iridium, osmium, rhodium, ruthenium, and rhenium circulated with the layered cracking catalyst of the instant invention. The addition of small amounts of the metal promotes oxidation of carbon monoxide formed by the burning off of carbonaceous residues from the cracking catalyst which yields additional heat which can be used in the cracking reaction. Further details concerning the addition of such CO-oxidation promoting metal to the catalyst inventory are found in U.S. Pat. Nos. 4,072,600 and 4,093,535, the contents of which are incorporated herein by reference.

It is claimed:

1. A layered catalytic cracking catalyst comprising a core and a shell, said shell comprising at least 5 wt % of at least 1 molecular sieve having openings of at least 8 angstroms and said core comprising at least 10 wt % of at least 1 molecular sieve having openings comprising a 12 or less-membered ring and said core further having a reduced, if any, content of said molecular sieve having openings of at least 8 angstroms, relative to its concentration in the shell.

2. The catalyst of claim 1 wherein the molecular sieve having openings of at least 8 angstroms is selected from the group consisting of materials having pore openings formed by at least 18 tetrahedral members.

3. The catalyst of claim 1 wherein said molecular sieve having openings of at least 8 angstroms is selected from the group consisting of a) a composition of matter comprising crystals having a framework topology after heating at 110° C. or higher giving an X-ray diffraction pattern with interplanar d-spacings at 16.4±0.2 angstroms, 8.2±0.1 angstroms and 4.74±0.05 angstroms, and without a significant interplanar d-spacing at 13.6-13.3 angstroms and b) VPI-5.

4. The catalyst of claim 1 wherein the molecular sieve having openings of at least 8 angstroms is an inorganic, porous non-layered crystalline phase material exhibiting, after calcination, an X-ray diffraction pattern with at least one peak at a d-spacing greater than about 18 Angstrom Units and having a benzene adsorption capacity of greater than 15 grams benzene per 100 grams of said calcined material at 50 torr and 25° C.

5. The catalyst of claim 1 wherein the molecular sieve having openings of at least 8 angstroms is an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than 18 Angstrom Units.

6. The catalyst of claim 1 wherein the molecular sieve having openings of at least 8 angstroms is a pillared layered metal oxide.

7. The catalyst of claim 1 wherein the molecular sieve having openings comprising a 12 or less-membered ring is selected from the group consisting of zeolite beta, zeolite L, zeolite X, zeolite Y, Dealuminized Y, Ultrastable Y, Ultrahydrophobic Y, Si-Enriched Dealuminized Y (LZ-210), ZSM-18, ZSM-20 and mordenite.

8. The catalyst of claim 1 wherein the molecular sieve having openings comprising a 12 or less-membered ring has a Constraint Index of 1-12.

9. The catalyst of claim 1 wherein the molecular sieve having openings comprising a 12 or less-membered ring is selected from the group consisting of ZSM-5, ZSM-11, ZSM-12, ZSM-22, ZSM-23, ZSM-35, ZSM-48, ZSM-57 and MCM-22.

10. The catalyst of claim 1 wherein the shell further comprises a metal immobilizing material selected from the group consisting of rare earth oxides, alkaline earth oxides, phosphates, titanates and stannates.

11. The catalyst of claim 1 wherein the shell comprises at least 1 wt % of magnesium, barium, calcium, lanthanum, cerium and compounds thereof.

12. The catalyst of claim 1 wherein the shell comprises a molecular sieve having openings comprising a 12-membered ring.

13. The catalyst of claim 1 wherein the shell comprises a molecular sieve having openings comprising a 12-membered ring selected from the group consisting of zeolite beta, zeolite L, zeolite X, zeolite Y, Dealuminized Y, Ultrastable Y, Ultrahydrophobic Y, Si-Enriched Dealuminized Y (LZ-210), ZSM-18, ZSM-20 and mordenite.

14. The catalyst of claim 1 wherein the shell comprises 60-90 percent inorganic oxide matrix.

15. The catalyst of claim 1 wherein the core comprises 50-99 weight % of the layered cracking catalyst and the shell comprises 50-1 weight % of the layered cracking catalyst; said shell comprising: 5 to 80 wt % of said molecular sieve having openings of at least 8 angstroms; 20 to 95 wt % of an inorganic oxide matrix; 0 to 30 wt % of a metal immobilizing material; and 0 to 20 wt % of molecular sieve having openings comprising a 12-membered ring; and said core comprising 10 to 80 wt % of a molecular sieve having openings comprising a 12-membered ring; 0 to 70 wt % of a molecular sieve having a Constraint Index of 1-12; and 20 to 95 wt % of an inorganic oxide matrix.

16. The catalyst of claim 1 wherein the core comprises 65 to 95 weight % of the layered cracking catalyst and the shell comprises 35 to 5 weight %; said shell comprising: 10 to 50 wt % of said molecular sieve having openings of at least 8 angstroms selected from the group consisting of MCM-41, VPI-5 and MCM-9; 20 to 70 wt % of alumina; 1 to 15 wt % of a metal immobilizing material selected from the group consisting of rare earth oxides, alkaline earth oxides, phosphates, titanates and stannates; and 0 to 10 wt % of molecular sieve having openings comprising a 12-membered ring ; and said core comprising: 20 to 60 wt % of a molecular sieve having openings comprising a 12-membered ring selected from the group consisting of zeolite beta, zeolite L, zeolite X, zeolite Y, Dealuminized Y, Ultrastable Y, Ultrahydrophobic Y, Si-Enriched Dealuminized Y (LZ-210), ZSM-18, ZSM-20 and mordenite; 5 to 20 wt % of a molecular sieve having a Constraint Index of 1-12 selected from the group consisting of ZSM-5, ZSM-11, ZSM-12, ZSM-22, ZSM-23, ZSM-35, ZSM-48, ZSM-57 and MCM-22; and 20 to 70 wt % of an alumina matrix.

17. The catalyst of claim 1 wherein the shell comprises at least 10 wt % of a coating comprising a refractory porous material selected from the group of:
    a) a rare earth oxide, aluminum oxide and aluminum phosphate composite;
    b) a magnesia, alumina, aluminum phosphate composite; and
    c) a tin (IV) oxide composite; and
the core comprises a cracking catalyst containing at least 10 wt % of zeolite Y in a matrix comprising silica and alumina.

18. The catalyst of claim 17 wherein said core comprises a cracking catalyst containing at least 10 wt % of rare earth Y zeolite.

19. A method of manufacturing a layered catalytic cracking catalyst comprising:
    a) forming a core comprising at least 1? wt % of at least 1 molecular sieve having openings comprising a 12 or less-membered ring and less than 5 wt % of molecular sieve having openings of at least 8 angstroms, by conventional means and
    b) forming a shell comprising at least 1 wt. % of the overall catalyst and containing at least 5 wt % of at least 1 molecular sieve having openings of at least 8 angstroms around the core by contacting the preformed core with a matrix containing at least 5 wt % of said molecular sieve having openings of at least 8 angstroms, and recovering a layered catalyst as a product.

* * * * *

UNITED STATES PATENT AND TRADEMARK OFFICE
CERTIFICATE OF CORRECTION

PATENT NO. : 5,179,054

DATED : January 12, 1993

INVENTOR(S) : Paul H. Schipper, et al.

It is certified that error appears in the above-identified patent and that said Letters Patent is hereby corrected as shown below:

Col. 42, line 10, "1? wt %" should read --10 wt %--.

Signed and Sealed this

Second Day of November, 1993

Attest:

BRUCE LEHMAN

Attesting Officer        Commissioner of Patents and Trademarks